(12) United States Patent
Shimizu et al.

(10) Patent No.: US 9,485,380 B2
(45) Date of Patent: Nov. 1, 2016

(54) IMAGE READING APPARATUS, IMAGE FORMING APPARATUS AND COMPUTER READABLE MEDIUM STORING PROGRAM

(71) Applicant: FUJI XEROX CO., LTD., Tokyo (JP)

(72) Inventors: Kosuke Shimizu, Yokohama (JP); Norikazu Sakai, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/620,839

(22) Filed: Feb. 12, 2015

(65) Prior Publication Data

US 2015/0381846 A1    Dec. 31, 2015

(30) Foreign Application Priority Data

Jun. 25, 2014 (JP) .................................. 2014-130234
Jul. 10, 2014 (JP) .................................. 2014-142411

(51) Int. Cl.
*H04N 1/04* (2006.01)
*H04N 1/028* (2006.01)

(52) U.S. Cl.
CPC ................................ *H04N 1/02815* (2013.01)

(58) Field of Classification Search
CPC ...................... H04N 1/00082; H04N 1/02815; H04N 9/3155; G03G 15/043; G03G 15/04054; G03G 15/326; G03B 21/2013; G03B 21/2073; G03B 35/16; G03B 35/26; G03F 7/70216; G03F 7/70291; G03F 7/70308; G09G 2320/00
USPC ........ 358/518, 1.1, 1.15, 1.18, 1.9, 449, 473, 358/475, 497, 505, 509, 538; 382/131, 141, 382/195, 314; 399/51
See application file for complete search history.

(56) References Cited

U.S. PATENT DOCUMENTS

| | | | |
|---|---|---|---|
| 5,414,529 A * | 5/1995 | Terada et al. ................. | 358/448 |
| 6,320,680 B1 * | 11/2001 | Rhoads ......................... | 358/497 |
| 6,631,219 B2 * | 10/2003 | Yushiya ................. | H04N 1/484 |
| | | | 382/312 |
| 6,724,504 B1 * | 4/2004 | Yamamoto ........... | H04N 1/0035 |
| | | | 355/27 |
| 6,753,986 B1 * | 6/2004 | Sato ....................... | H04N 1/484 |
| | | | 358/468 |
| 7,388,691 B2 * | 6/2008 | Wang ....................... | H04N 1/04 |
| | | | 250/208.1 |
| 7,449,666 B2 * | 11/2008 | Kaihotsu ...................... | 250/205 |
| 7,592,574 B2 | 9/2009 | Sakai et al. | |
| 8,384,625 B2 * | 2/2013 | Hajjar et al. ................. | 345/75.1 |
| 8,593,686 B2 * | 11/2013 | Kanemoto ..................... | 358/1.9 |
| 8,634,114 B2 * | 1/2014 | Mori ....................... | H04N 1/46 |
| | | | 358/448 |
| 2002/0051238 A1 * | 5/2002 | Yamamoto ......... | H04N 1/00204 |
| | | | 358/468 |
| 2008/0111055 A1 | 5/2008 | Sakai et al. | |
| 2008/0316548 A1 * | 12/2008 | Yamauchi ......... | G02B 27/0905 |
| | | | 358/475 |

(Continued)

FOREIGN PATENT DOCUMENTS

| | | |
|---|---|---|
| JP | 2006-304200 A | 11/2006 |
| JP | 2008-124985 A | 5/2008 |
| JP | 2010-081369 A | 4/2010 |

*Primary Examiner* — Negussie Worku
(74) *Attorney, Agent, or Firm* — Oliff PLC

(57) ABSTRACT

An image reading apparatus includes: an illumination unit that is disposed so as to be moved relative to a recording medium and illuminates the recording medium with light beams of plural colors that are circulated in predetermined order; a reading unit that reads an image recorded on the recording medium by receiving reflection light that is produced as a result of the illumination unit's illuminating the recording medium during the moving relative to the recording medium; and a control unit that controls the illumination unit so that a difference between a first illumination interval and a second illumination interval is determined based on a reading resolution of the reading unit.

14 Claims, 28 Drawing Sheets

(56) References Cited

U.S. PATENT DOCUMENTS

| | | | | |
|---|---|---|---|---|
| 2009/0109500 | A1* | 4/2009 | Hasegawa et al. | 358/474 |
| 2009/0296172 | A1* | 12/2009 | Iwatsuka | H04N 1/40 358/509 |
| 2011/0013231 | A1* | 1/2011 | Hagio | H04N 1/00013 358/443 |
| 2011/0013238 | A1* | 1/2011 | Kamio | H04N 1/00002 358/475 |
| 2011/0194161 | A1* | 8/2011 | Nakamura | 358/505 |
| 2012/0113479 | A1* | 5/2012 | Sakai | 358/447 |
| 2013/0050774 | A1* | 2/2013 | Shimizu | H04N 1/00702 358/449 |
| 2013/0070319 | A1* | 3/2013 | Yamada | H04N 1/6086 358/518 |
| 2013/0258425 | A1* | 10/2013 | Maeda et al. | 358/475 |
| 2014/0017430 | A1* | 1/2014 | Kimura | B65D 65/40 428/36.4 |
| 2014/0022605 | A1* | 1/2014 | Shimizu | H04N 1/00896 358/449 |
| 2014/0029074 | A1* | 1/2014 | Tanaka | H04N 1/484 358/518 |
| 2014/0152793 | A1* | 6/2014 | Staker et al. | 348/79 |
| 2014/0160515 | A1* | 6/2014 | Goda | 358/1.14 |
| 2015/0022868 | A1* | 1/2015 | Shimizu | H04N 1/125 358/475 |
| 2015/0233845 | A1* | 8/2015 | Fukuda | G01N 23/20016 378/44 |

* cited by examiner

IMAGE READING APPARATUS, IMAGE FORMING APPARATUS AND COMPUTER READABLE MEDIUM STORING PROGRAM

CROSS-REFERENCE TO RELATED APPLICATIONS

This application is based on and claims priority under 35 USC 119 from Japanese Patent Application No. 2014-130234 filed on Jun. 25, 2014 and Japanese Patent Application No. 2014-142411 filed on Jul. 10, 2014.

BACKGROUND

Technical Field

The present invention relates to an image reading apparatus, an image forming apparatus, and a computer readable medium storing a program.

SUMMARY

According to an aspect of the invention, there is provided an image reading apparatus comprising an illumination unit that is disposed so as to be moved relative to a recording medium and illuminates the recording medium with light beams of plural colors that are circulated in predetermined order; a reading unit that reads an image recorded on the recording medium by receiving reflection light that is produced as a result of the illumination unit's illuminating the recording medium during the moving relative to the recording medium; and a control unit that controls the illumination unit so that a difference between a first illumination interval between adjoining colors within each illumination cycle of light beams of the plural colors circulated in the predetermined order and a second illumination interval from illumination with light of the last color of the cycle to illumination with light of the first color of the next cycle is determined based on a reading resolution of the reading unit.

DESCRIPTION OF SYMBOLS

Figure 1:
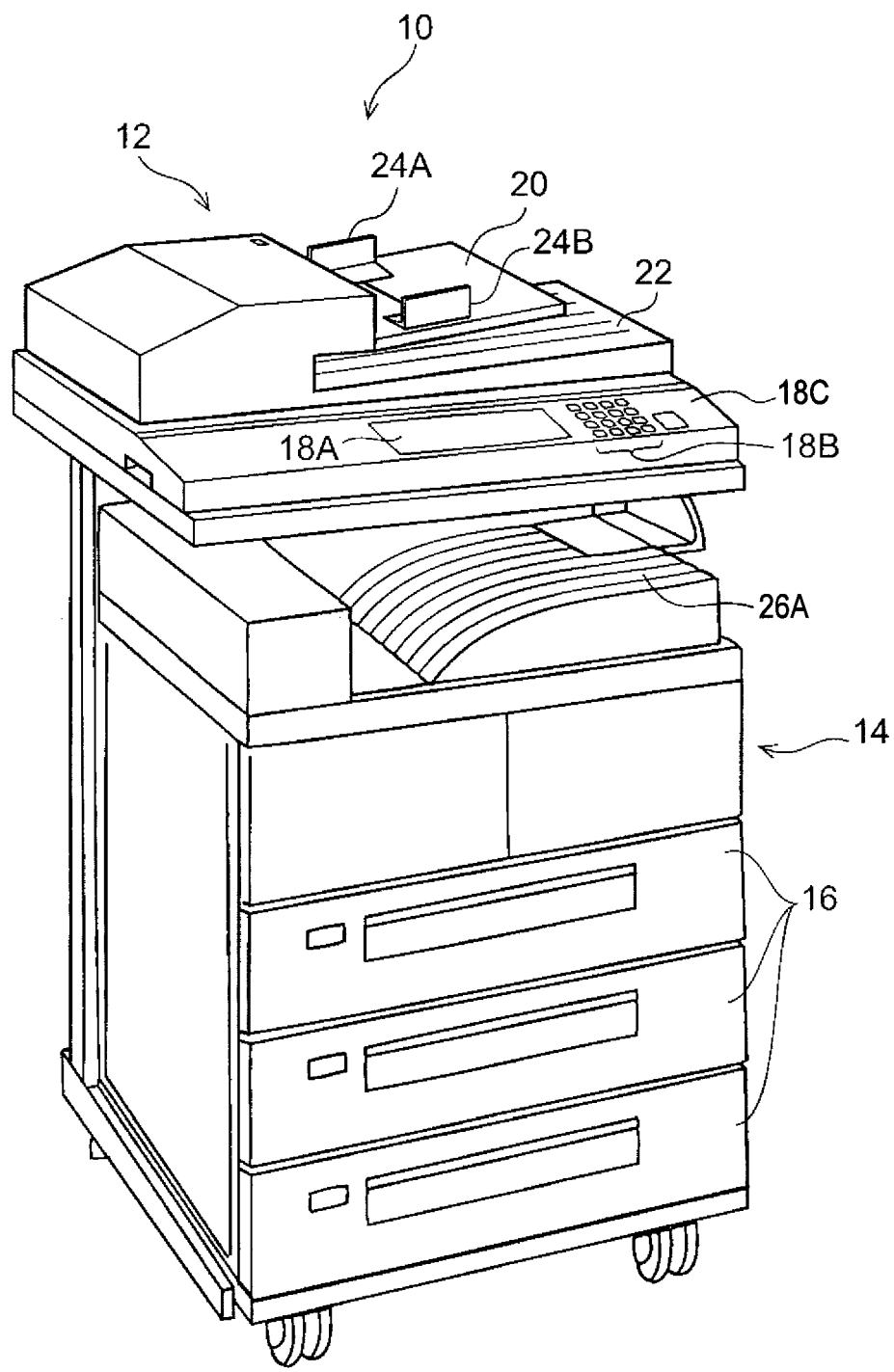
FIG. 1 is a general perspective view showing an example appearance of an image forming apparatus according to a first exemplary embodiment.

10: Image forming apparatus
12: Image reading unit
14: Image forming unit
60A: First LED
60B: Second LED
60C: Third LED
52A: CIS
68E: AFE
10A, 200, 300: Image reading apparatus
18: Document page
28B: Back surface lamp
34: Front surface lamp
52, 87, 310: Image reading control unit
68A, 68B, 68C: Cycle signal transmission program
68D: LED identification information transmission program
76, 88, 92, 500: Front surface illumination control unit
77, 90, 94, 502: Back surface illumination control unit
96A: Front surface first LED
96B: Front surface second LED
96C: Front surface third LED
98A: Back surface first LED
98B: Back surface second LED
98C: Back surface third LED
508, 510, 512: First lighting control program
514: Front surface LED setting program
516, 518, 520: Second lighting control program
522: Back surface LED setting program

DETAILED DESCRIPTION

Exemplary embodiments of the present invention will be hereinafter described in detail with reference to the accompanying drawings.

Exemplary Embodiment 1

As shown in FIG. 1, an example image forming apparatus 10 is equipped with an image reading unit 12 which is an example image reading apparatus according to the invention, an image forming unit 14, sheets housing units 16, and a user interface (UI) 18C.

The image reading unit 12 is equipped with a document stage 20 and an ejection stage 22. The top surface of the document stage 20 is provided with a pair of guide members 24A and 24B. Capable of being moved manually in the width of document pages placed on the document stage 20, the pair of guide members 24A and 24B guide document pages placed on the document stage 20 so that each document page is conveyed in the conveying direction. The image reading unit 12 takes in document pages one by one, reads an image on each document page by a line-sequential method, and acquires image information representing the read-out image. The image reading unit 12 outputs the acquired image information to a CPU 72 (described later) and then ejects the document page to the ejection stage 22.

The line-sequential method is a method of reading one line of a document page by each reading operation by turning on one of red (R), green (G), and blue (B) light sources while switching between them as the light sources and a line sensor are moved relative to the document page.

The light sources are a first LED 60A, a second LED 60B, and a third LED 60C (described later). The line sensor is what is called a monochrome image sensor which is composed of photoelectric conversion elements 66. The above-mentioned relative movement has the following three modes: a document page is moved whereas the positions of the light sources and the line sensor are fixed; the light sources and the line sensor are moved whereas the position of a document page is fixed; and the light sources and the line sensor are moved in a direction opposite to a direction in which a document page is moved.

The plural sheets housing units 16 house respective sets of sheets of different sizes (a sheet is an example recording medium). The image forming unit 14 picks up a sheet from one sheets housing unit 16 and forms an image on the sheet. Example images to be formed on a sheet are an image represented by image information that is acquired from the image reading unit 12 by the CPU 72 (described later), an image represented by image information that is acquired from an external apparatus 86A (described later) by the CPU 72, and a reference image for image quality adjustment (what is called a patch). The image forming unit 14 ejects, to an ejection stage 26A, a sheet on which an image has been formed. The image forming method may be either an electrophotographic method or an inkjet method.

The UI unit 18C is equipped with a touch screen display 18A for displaying an image and switches 18B. The touch screen display 18A and the switches 18B serve to receive, from a user of the image forming apparatus 10, various instructions, examples of which are a scan start instruction which is an instruction for causing the image reading unit 12 to start image reading and an instruction for causing the image forming unit 14 to start image formation. The touch screen display 18A displays various kinds of information such as a result of processing that has been performed in response to a received instruction and an alarm.

Figure 2:
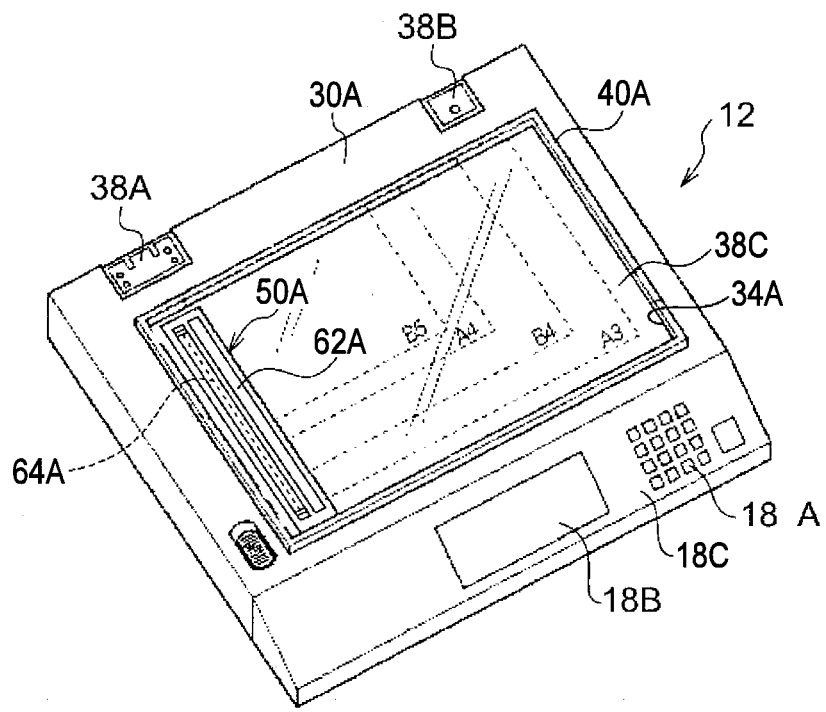
FIG. 2 shows a general perspective view showing an example appearance of part of an image reading unit of the image forming apparatus according to the first exemplary embodiment.
Figure 3:
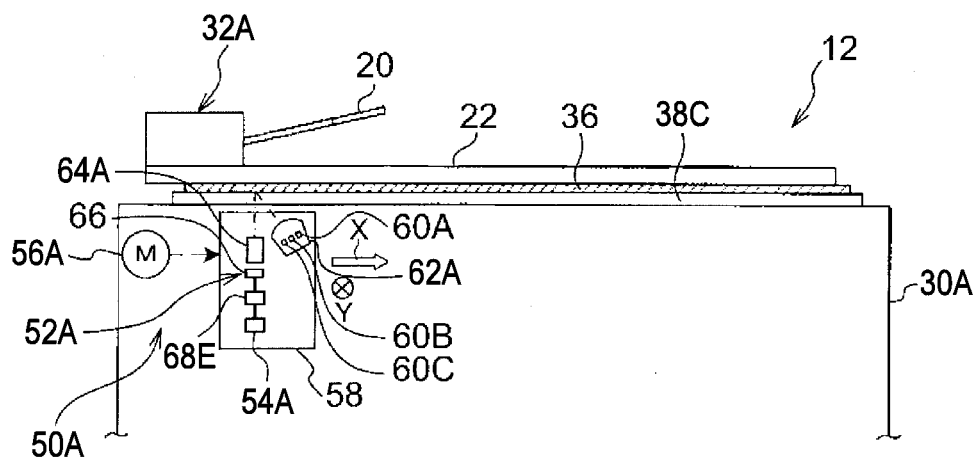
FIG. 3 is a schematic side view showing an example configuration of the image reading unit of the image forming apparatus according to the first exemplary embodiment.

For example, as shown in FIGS. 2 and 3, the image reading unit 12 includes a body 30A and a document feeder 32A which is an example relative speed changing unit of the invention. The document feeder 32A is equipped with the document stage 20 and the ejection stage 22.

For example, as shown in FIG. 2, the body 30A houses an image reading unit body 50A and the top surface of the body 30A is formed with a rectangular opening 34A. In the exemplary embodiment, the opening 34A is larger than an A3-size document and is closed by a platen glass 38C on which a document page 36 (see FIG. 3) is to be placed. The document page 36 is a sheet on which an image is recorded in an image recording area. Although the image reading unit 12 according to the exemplary embodiment employs a colorless, transparent glass plate as the platen glass 38C, the invention is not limited to such a case; the platen glass 38C may be any transparent document stage.

The top surface of the body 30A is provided with fixing portions 38A and 38B to which hinge members (not shown) are fixed that are provided on the bottom surface of the document feeder 32A (see FIG. 3). The hinge members allow document feeder 32A to be rotated between a position where to expose the platen glass 38C and a position where to cover the platen glass 38C.

A rectangular-frame-shaped document setting guide 40A is formed around the platen glass 38C. The top surface of the document setting guide 40A is slightly higher than the top surface of the platen glass 38C, as a result of which a document page 36 is positioned by bringing its corner portion into contact with side surfaces of a corner portion of the document setting guide 40A. The top surface of the document setting guide 40A is provided with a positioning mark (not shown) and document size labels (not shown). The positioning mark is a mark to be used in registering the corner portion of a document page 36 with that of the document setting guide 40A. The document size labels are marks where ends of a document page 26 having a regular size (B5, A4, B4, or A3) should be located when it is placed on the platen glass 38C with its corner portion registered with that of the document setting guide 40A.

For example, in the document feeder 32A shown in FIG. 3, a document page 36 is fed to a document flipping unit (not shown) from the document stage 20. Where plural document pages 36 are stacked on the document stage 20, the topmost document page 36 is fed to the document flipping unit. The document page 36 is flipped by the document flipping unit and then passes a reading region on the platen glass 38C. Image reading is performed while the document page 36 is passing the reading region. The document page 36 is then ejected to the ejection stage 22.

For example, as shown in FIG. 3, the image reading unit body 50A includes a contact image sensor (CIS) 52A, an image processing circuit 54A, and a motor 56A. The CIS 52A and the image processing circuit 54A are mounted on a carriage 58, which receives drive power of the motor 56A and is thereby moved in the X direction (auxiliary scanning direction; see FIG. 3) which corresponds to the longitudinal direction of the opening 34A.

The CIS 52A has a first LED (light-emitting diode) 60A having a red (R) emission wavelength range, a second LED 60B having a green (G) emission wavelength range, and a third LED 60C having a blue (B) emission wavelength range. The first LED 60A, the second LED 60B, and the third LED 60C are an example illumination unit of the invention.

The first LED 60A, the second LED 60B, and the third LED 60C are driven sequentially so as to emit R light, G light, and B light in predetermined circulation color order, that is, R→G→B→R→G→B . . . (one cycle: R→G→B). Although in the exemplary embodiment the first color and the last color of each cycle is R and B, respectively, the invention is not limited to such a case. The first color and the last color may be G and R or B and G, respectively. In the following, for convenience of description, the first LED 60A, the second LED 60B, and the third LED 60C will be referred to as an "LED(s) 60" when it is not necessary to discriminate between them.

The CIS 52A has a lightguide 62A and a focusing unit 64A. The CIS 52A also has photoelectric conversion elements 66 which are part of an example reading unit of the invention and an analog front end (AFE) 68E which is part of the example reading unit and a control unit of the invention. The AFE 68E is a circuit commonly called an analog preprocessor.

For example, as shown in FIG. 2, the lightguide 62A extends long in the Y direction (main scanning direction; see FIG. 3) which corresponds to the shorter-axis direction of the opening 34A. For example, as shown in FIG. 3, the LEDs 60 are attached to one end of the lightguide 62A, which guides light that is emitted from a turned-on one of the LEDs 60 to a document page 36 in line form.

As shown in FIG. 2, the focusing unit 64A is a lens unit in which plural erecting, equal-magnification, imaging forming lens elements are arranged in the main scanning direction. The focusing unit 64A focuses reflection light that is reflected from the document page 36 when the document page 36 is illuminated with light that is emitted from a turned-on LED 60 and guided by the lightguide 62A.

The plural photoelectric conversion elements 66, which are arranged in the Y direction, receive and perform photoelectric conversion on (an image of) the reflection light focused by the focusing unit 64A and thereby generate and output pieces of analog image information which are electrical signals representing reception light quantities. The pieces of mage information generated by and output from the photoelectric conversion elements 66 are image information representing an R image (R image information), image information representing a G image (G image information), and image information representing a B image (B image information). In the following, for convenience of description, the R image information, B image information, and B image information will be referred to as "image information" when it is not necessary to discriminate between them.

The AFE 68E adjusts the image information received from the photoelectric conversion elements 66 using an amplifier, an A/D converter, a filter, etc. (none of which are shown) and outputs resulting digital image information, an example of which is 16-bit image information.

The image processing circuit 54A has, as functions of processing, in circulation color order starting from a particular color, the image information received from the AFE 68E, functions of performing various kinds of image processing such as shading correction, gamma conversion correction, pixel arrangement conversion. Although in the exemplary embodiment the particular color is R, the invention is not limited to such a case; it may be G or B.

Figure 4:
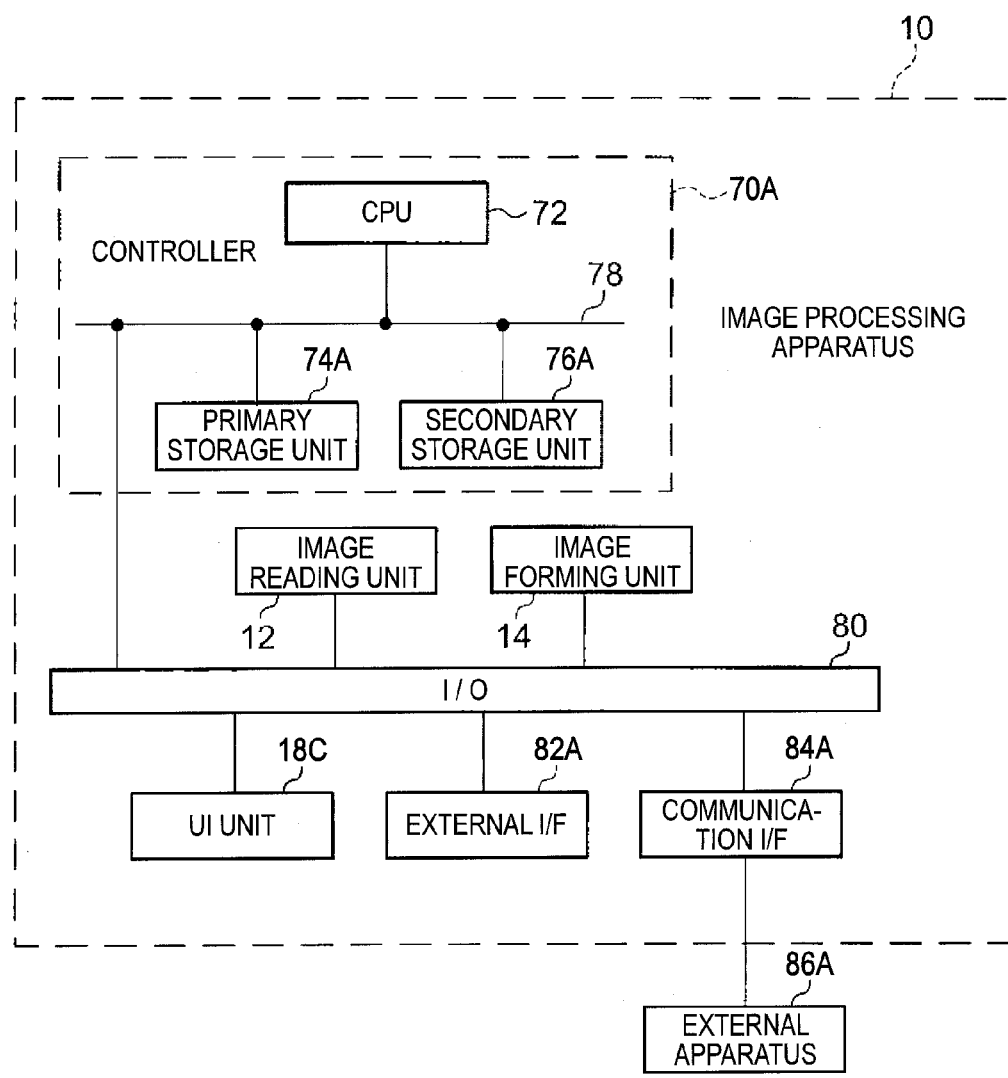
FIG. 4 is a block diagram showing an example hardware configuration of an electrical system of the image forming apparatus according to the first exemplary embodiment.

For example, as shown in FIG. 4, the image forming apparatus 10 is equipped with a controller 70A, which is equipped with a CPU (central processing unit) 72, a primary storage unit 74A, and a secondary storage unit 76A. The primary storage unit 74A is a volatile memory (e.g., RAM (random access memory)) that is used as a working area etc. when various programs are run. The secondary storage unit 76A is a nonvolatile memory that is stored in advance with control programs for controlling operations of the image forming apparatus 10, various parameters, etc. Examples of the secondary storage unit 76A are a flash memory and a hard disk drive. The CPU 72, the primary storage unit 74A, and the secondary storage unit 76A are connected to each other by a bus 8.

The image forming apparatus 10 is equipped with an input/output interface (hereinafter referred to as "I/O") 80 which is electrically connected to various input/output devices and serves for exchange of various kinds of information between the CPU 72 and the various input/output devices.

The image forming apparatus 10 is equipped with the image reading unit 12, the image forming unit 14, and the UI unit 18C as input/output devices that are connected to the I/O 80 and thereby electrically connected to the CPU 72 by a bus 78. The image forming apparatus 10 is also equipped with other input/output devices, that is, an external interface (I/F) 82A and a communication I/F 84A.

Connected to an external device (e.g., USB memory), the external I/F serves for exchange of various kinds of information between the external device and the CPU 72. Connected to a communication medium such as a LAN (local area network) or the Internet, the communication I/F 84A serves for exchange of various kinds of information with an external apparatus 86A connected to the communication medium. An example of the external apparatus 86A is a personal computer.

The CPU 72 recognizes operation statuses of the input/output devices, controls the input/output devices, and performs other kinds of processing on them by exchanging various kinds of information with them via the BUS 78 and the I/O 80.

Figure 5:
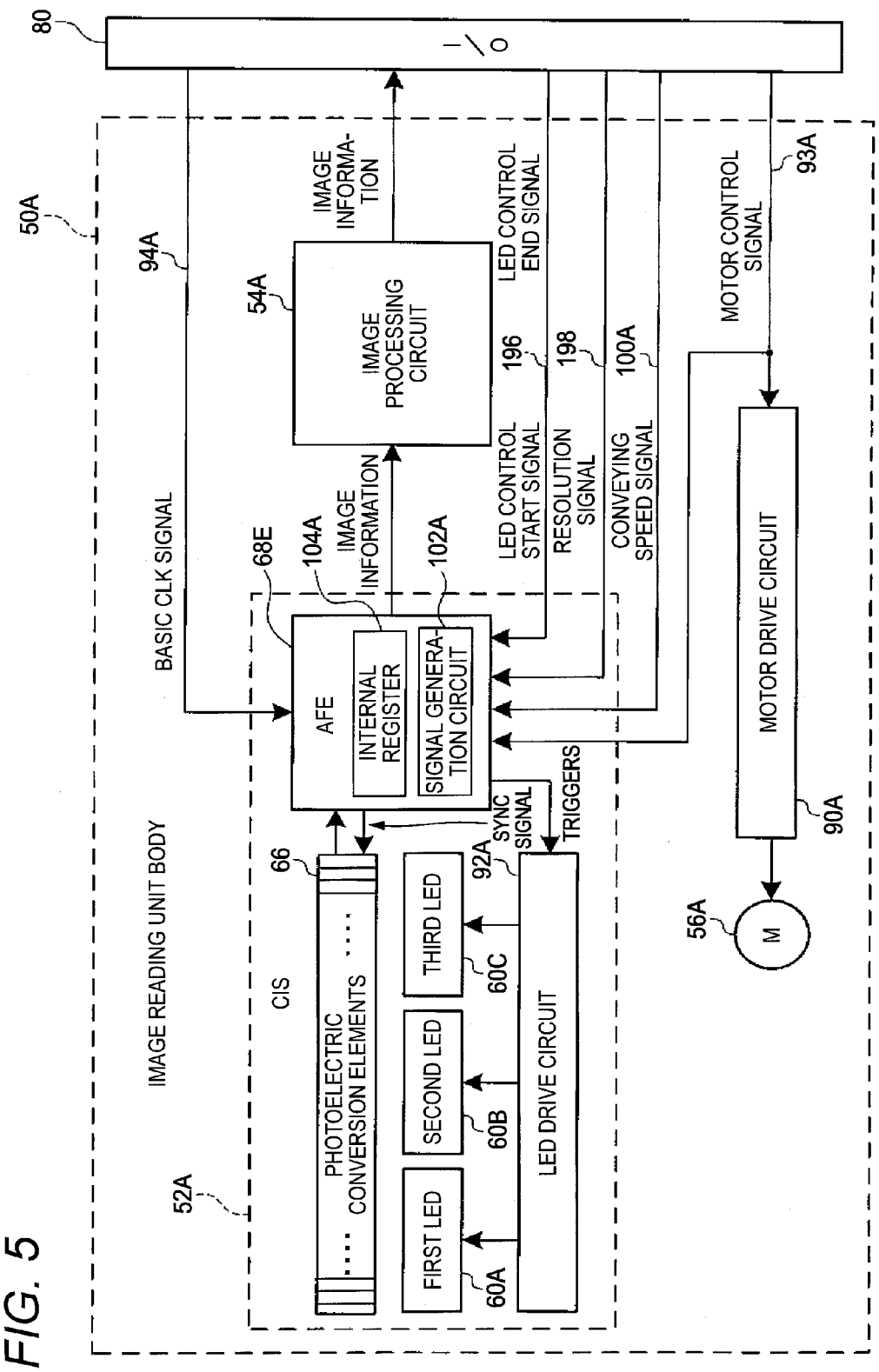
FIG. 5 is a block diagram showing an example hardware configuration of an electrical system of an image reading unit body of the image reading unit of the image forming apparatus according to the first exemplary embodiment.

For example, as shown in FIG. 5, the image reading unit body 50A is equipped with a motor drive circuit 90A which is an example relative speed changing unit of the invention. The motor drive circuit 90A is connected to the motor 56A and is also connected to the I/O 80 by a signal line 93A. A motor control signal is input to the motor drive circuit 90A from the CPU 72 via the I/O 80 and the signal line 93A in response to a scan start instruction that is received by the UI unit 18C. The motor control signal is a signal including information that indicates a rotation speed of the motor 56A. The motor drive circuit 90A controls the motor 56A according to the received motor control signal.

The carriage 58 receives drive power of the motor 56A and the CIS 52A is thereby moved in the X direction. The CIS 52A is moved in a state that a document page 36 is place on the platen glass 38C. The movement speed of the CIS 52A is generally classified into a movement speed for high resolution and a movement speed for low resolution. In the exemplary embodiment, the movement speed for high resolution is a movement speed that is employed when the image reading resolution of the CIS 52A is higher than or equal to 600 dpi. And the movement speed for low resolution is a movement speed that is employed when the image reading resolution of the CIS 52A is lower than 600 dpi.

The CIS 52A is equipped with an LED drive circuit 92A, which is connected to the first LED 60A, the second LED 60B, and the third LED 60C.

The AFE 68E is connected to the LED drive circuit 92A and is also connected to the I/O 80 by signal lines 94A, 196, 198, 100A, and 102A. In response to a scan start instruction that is received by the UI unit 18C, an LED control start signal is generated by the CPU 72 and output to the AFE 68E from the CPU 72 via the I/O 80 and the signal line 196. Upon receiving the LED control start signal, the AFE 68E starts controlling the LEDs 60 via the LED drive circuit 92A.

An LED control end signal is input to the AFE 68E from the CPU 72 via the I/O 80 and the signal line 196. The LED control end signal is generated by the CPU 72 when an image reading end condition is satisfied. Upon receiving the LED control end signal, the AFE 68E finishes controlling the LEDs 60 via the LED drive circuit 92A. An example image reading end condition is that an image reading operation on one document page 36, that is, a movement of the CIS 52A relative to the one document page 36, has been completed.

In response to the scan start instruction that is received by the UI unit 18C, a resolution signal is input to the AFE 68E from the CPU 72 the I/O 80 and the signal line 198. In response to the scan start instruction that is received by the UI unit 18C, a conveying speed signal is input to the AFE 68E from the CPU 72 the I/O 80 and the signal line 100A. In response to the scan start instruction that is received by the UI unit 18C, a motor control signal is further input to the AFE 68E from the CPU 72 the I/O 80 and the signal line 93A.

The resolution signal is a signal indicating an image reading resolution of the CIS 52A, which is determined by, for example, an instruction that is received by the UI unit 18C.

The conveying speed signal is a signal indicating a document conveying speed of the document feeder 32A. The document feeder 32A conveys a document page 36 in a state that the carriage 58 is stopped. The document conveying speed of the document feeder 32A is generally classified into a conveying speed for high resolution and a conveying speed for low resolution. In the exemplary embodiment, the conveying speed for high resolution is a conveying speed that is employed when the image reading resolution of the CIS 52A is higher than or equal to 600 dpi. And the conveying speed for low resolution is a conveying speed that is employed when the image reading resolution of the CIS 52A is lower than 600 dpi.

In the following, for the sake of convenience, the above-mentioned movement speed for high resolution and conveying speed for high resolution will be referred to as a speed for high resolution and above-mentioned movement speed for low resolution and conveying speed for low resolution will be referred to as a speed for low resolution.

The LED drive circuit 92A turns on the first LED 60A, the second LED 60B, and the third LED 60C in the circulation color order under the control of the AFE 68E.

The AFE 68E is connected to the photoelectric conversion elements 66. The AFE 68E is equipped with a signal generation circuit 102A and an internal register 104A. The signal generation circuit 102A generates (and outputs) a trigger and a sync signal on the basis of a basic clock signal (basic CLK signal) that is received from the CPU 72 via the I/O 80 and the signal line 94A.

The trigger is a signal indicating turn-on timing for each LED 60 and is input to the LED drive circuit 92A. The LED drive circuit 92A turns on each LED 60 in response to a trigger that is received from the AFE 68E. The sync signal is a sync signal indicating image information output timing. The exemplary embodiment employs, as an example relationship between turning-on of each LED 60 and the image information output timing, a relationship that after turning-on of an LED 60, image information is output before output of the next trigger. However, the invention is not limited to such a case; the next trigger may be same as the sync signal. Since turning-on of an LED and output of a sync signal are repeated in the circulation color order, the trigger and the sync signal may be same signal.

Incidentally, a method of lowering the image reading resolution by reading an image by switching the movement speed of the CIS 52A relative to a document page from a speed for high resolution to a speed for low resolution is known.

Although in the exemplary embodiment the term "high resolution" means a resolution that is higher than or equal to 600 dpi and the term "low resolution" means a resolution that is lower than 600 dpi, the invention is not limited to such a case. For example, a high resolution range may be defined as a resolution range in which color deviations (described later) due to the relationship between the speed of the CIS 52A relative to a document page 36 and the line density of an image on the document page 36 do not occur, with a low resolution range defined as the other resolution range. The high resolution range and the low resolution range may be determined in advance by a simulation, a test using an actual machine, or the like.

The speed for low resolution is higher than that for high resolution. Therefore, if, for example, the speed for low resolution is employed and an image on a document page 36 is read at a resolution that is lower than 600 dpi by turning on the LEDs 60 in the circulation color order at fixed (monotonic) cycles, color deviations may occur depending on the relationship between the speed for low resolution and the line density of the image on the document page 36. The term "color deviations" as used herein means color deviations that cannot be disregarded, for example, color deviations that are difficult to correct by image processing of the image forming circuit 54A.

Color deviations also occur also at the speed for high resolution as long as a line-sequential method is employed as a reading method because of differences between R, G, and B reading positions. However, color deviations being addressed in the exemplary embodiment are ones that are larger than color deviations that occur at the speed for high resolution, that is, color deviations that occur at the speed for low resolution which is higher than that for high resolution.

In view of the above, to suppress color deviations, a trigger output interval is derived according to a relationship between an image reading resolution of the CIS 52A and a movement speed of the CIS 52A relative to a document page 36.

To derive a trigger output interval, the AFE 68E is equipped with the internal register 104A which is stored with first output interval information and pieces of second output interval information. Selection from the first output interval information and pieces of second output interval information is made by the AFE 68E according to the movement speed of the CIS 52A relative to a document page 36, that is, whether it is a speed for high resolution or a speed for low resolution. In the following, for convenience of description, the first output interval information and the second output interval information will be referred to as "output interval information" when it is not necessary to discriminate between them.

The output interval information is information indicating a trigger output interval. An example of the output interval information is the number of clock pulses that determines a trigger output interval.

The difference between the trigger output interval indicated by the first output interval information and that indicated by each piece of second output interval information is determined according to an image reading resolution of the CIS 52A. The trigger output interval indicated by the first output interval information is fixed irrespective of the image reading resolution of the CIS 52A. The trigger output interval indicated by each piece of second output interval information is longer than that indicated by the first output interval information. The pieces of second output interval information are determined for respective image reading resolutions of the CIS 52A; the trigger output interval indicated by the second output interval information becomes longer as the image reading resolution becomes lower. The trigger output interval indicated by the first output interval information corresponds to the term "first illumination interval" as used in the invention, and the trigger output interval indicated by the second output interval information corresponds to the term "second illumination interval" as used in the invention.

The AFE 68E judges whether the movement speed of the CIS 52A relative to a document page 36 is a speed for high resolution or a speed for low resolution on the basis of a resolution signal and a conveying speed signal or a resolution signal and a motor control signal. The AFE 68E selectively acquires the first output interval information or a piece of second output interval information from the internal register 104A according to a result of the judgment as to whether the movement speed of the CIS 52A relative to the document page 36 is a speed for high resolution or a speed for low resolution. The AFE 68E outputs triggers at an output interval that is indicated by the first output interval information or the second output interval information acquired from the internal register 104A.

The AFE 68E performs processing corresponding to processing performed by a general AFE on each of pieces of image information that are received from the photoelectric conversion elements 66 in the circulation color order starting from R. Connected to the image processing circuit 54A, the AFE 68E outputs pieces of image information to the image processing circuit 54A in the circulation color order in synchronism with output of sync signals.

The image reading unit body 50A is equipped with the image processing circuit 54A, which has an FPGA (field programmable fate array) and a CPU (not shown) incorporating an ASIC (application-specific integrated circuit). Connected to the I/O 80, the image processing circuit 54A performs predetermined plural kinds of processing such as shading correction on the image information received from the AFE 68E and outputs resulting image information to a predetermined output destination such as the CPU 72 via the I/O 80.

Next, how the image forming apparatus 10 according to the exemplary embodiment operates will be described. First, referring to FIGS. 6 and 7, a description will be made of a lighting control process that is executed by the AFE 68E when a scan start instruction is received by the UI unit 18C. For convenience of description, a description will be made of a case that the CIS 52A performs image reading by moving the CIS 52A in the X direction relative to a document page 36 placed on the platen glass 38C and an instruction indicating a resolution of image reading by the CIS 52A has already been received by the UI unit 18C.

Figure 6:
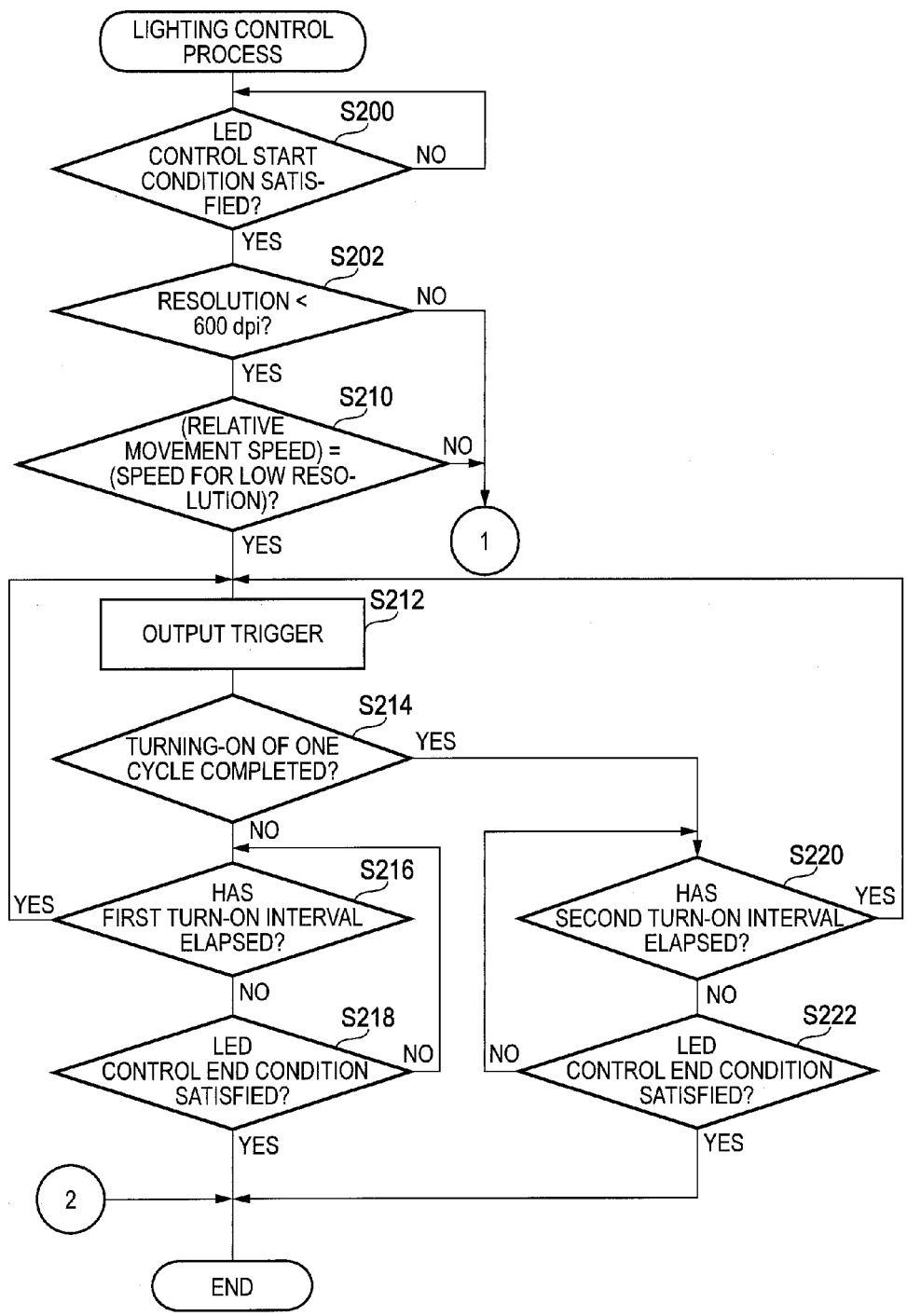
FIG. 6 is a flowchart of a main part of an example lighting control process according to the first exemplary embodiment.
Figure 7:
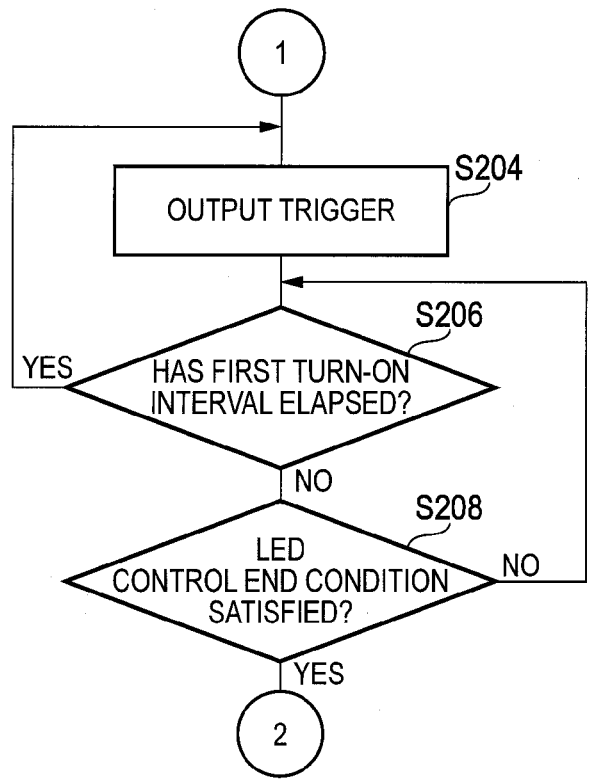
FIG. 7 is the other part of the example lighting control process according to the first exemplary embodiment.

In the lighting control process shown in FIGS. 6 and 7, first, at step S200, the AFE 68E judges whether an LED control start condition which is a condition for a start of a control for turning on the LEDs 60 is satisfied or not. In the exemplary embodiment, the LED control start condition is that an LED control start signal, a resolution signal, and a conveying speed signal or an LED control start signal, a resolution signal, and a motor control signal should have been received. However, this condition is just an example and another condition may be added.

If it is judged at step S200 that the LED control start condition is not satisfied (S200: no), step S200 is executed again. If it is judged at step S200 that the LED control start condition is satisfied (S200: yes), the process moves to step S202.

At step S202, it is judged whether the resolution indicated by the resolution signal is lower than 600 dpi which is an example threshold value used in the invention. If it is judged at step S202 that the resolution indicated by the resolution signal is higher than or equal to 600 dpi (S202: no), the process moves to step S204.

At step S204, the AFE 68E outputs a trigger to the LED drive circuit 92A. Upon receiving the trigger from the AFE 68E, the LED drive circuit 92A turns on an LED 60 according to the circulation color order. Reflection light that is produced by illuminating the image recording area of the document page 36 with light emitted from the turned-on LED 60 is received by the photoelectric conversion elements 66 and image information is thereby generated.

At step S206, the AFE 68E judges whether or not a first turn-on interval has elapsed from the end of execution of step S204. The first turn-on interval is a time that is equal to the trigger output interval indicated by the first output interval information stored in the internal register 104A.

If it is judged at step S206 that the first turn-on interval has not elapsed yet from the end of execution of step S204 (S206: no), the process moves to step S208. If it is judged at step S206 that the first turn-on interval has elapsed from the end of execution of step S204 (S206: yes), the process returns to step S204.

At step S208, the AFE 68E judges whether an LED control end condition which is a condition for finishing a control for turning on the LEDs 60 is satisfied or not. In the exemplary embodiment, the LED control end condition is that an LED control end signal should have been received. However, this condition is just an example and it may be added with another condition or replaced by another condition.

If it is judged at step S208 that the LED control end condition is not satisfied (S208: no), the process returns to step S206. If it is judged at step S208 that the LED control end condition is satisfied (S208: yes), the lighting control process is finished.

On the other hand, if it is judged at step S202 that the resolution indicated by the resolution signal is lower than 600 dpi (S202: yes), the process moves to step S210. At step S210, the AFE 68E judges whether or not the relative movement speed of the CIS 52A relative to the document page 36 is a speed for low resolution on the basis of the motor control signal, for example. If it is judged at step S210 that the relative movement speed of the CIS 52A relative to the document page 36 is not a speed for low resolution, that is, it is a speed for high resolution (S210: no), the process moves to step S204. If it is judged at step S210 that the relative movement speed of the CIS 52A relative to the document page 36 is a speed for low resolution (S210: yes), the process moves to step S212.

At step S212, the AFE 68E outputs a trigger to the LED drive circuit 92A. Upon receiving the trigger from the AFE 68E, the LED drive circuit 92A turns on an LED 60 according to the circulation color order. Reflection light that is produced by illuminating the image recording area of the document page 36 with light emitted from the turned-on LED 60 is received by the photoelectric conversion elements 66 and image information is thereby generated.

At step S214, the AFE 68E judges whether or not turning-on of one cycle of the circulation color order has been completed. The term "turning-on of one cycle" means turning-on of the first LED 60A, turning-on of the second LED 60B, and turning-on of the third LED 60C combined. In each cycle, turning-on of the first LED 60A, turning-on of the second LED 60B, and turning-on of the third LED 60C are first turning-on, second turning-on, and third turning-on, respectively.

If it is judged at step S214 that turning-on of one cycle of the circulation color order has not been completed yet (S214: no), the process moves to step S216. At step S216, the AFE 68E judges whether or not the first turn-on interval has elapsed from the end of execution of step S212. If it is judged at step S216 that the first turn-on interval has not elapsed yet from the end of execution of step S212 (S216: no), the process moves to step S218. If it is judged at step S216 that the first turn-on interval has elapsed from the end of execution of step S212 (S216: yes), the process returns to step S212.

At step S218, the AFE 68E judges whether the LED control end condition is satisfied or not. If it is judged at step S218 that the LED control end condition is not satisfied (S218: no), the process returns to step S216. If it is judged at step S218 that the LED control end condition is satisfied (S218: yes), the lighting control process is finished.

On the other hand, if it is judged at step S214 that turning-on of one cycle of the circulation color order has been completed (S214: yes), the process moves to step S220. At step S220, the AFE 68E judges whether or not a second turn-on interval has elapsed from the end of execution of step S212. The second turn-on interval is a time that is equal to the trigger output interval indicated by a piece of second output interval information stored in the internal register 104A. The trigger output interval indicated by the second output interval information varies depending on the resolution indicated by the resolution signal that is received by the AFE 68E. Therefore, second turn-on interval also varies depending on the resolution indicated by the resolution signal.

If it is judged at step S220 that the second turn-on interval has not elapsed yet from the end of execution of step S212 (S220: no), the process moves to step S222. If it is judged at step S220 that the second turn-on interval has elapsed from the end of execution of step S212 (S220: yes), the process returns to step S212.

Figure 9:
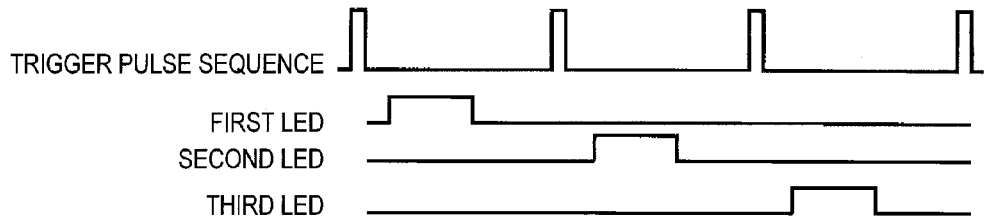
FIG. 9 is a time chart showing an example conventional timing relationship between trigger output intervals and on-periods of LEDs which are turned on in response to respective triggers in a case that the image reading resolution of a CIS is 400 dpi.
Figure 10:
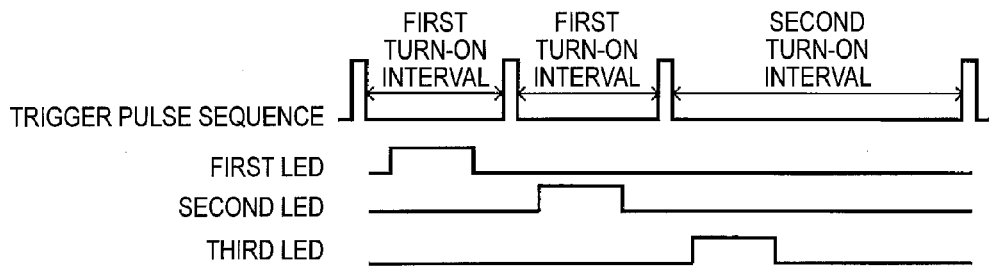
FIG. 10 is a time chart showing an example timing relationship between trigger output intervals and on-periods of the LEDs which are turned on in response to respective triggers in the lighting control process according to the first exemplary embodiment in a case that the image reading resolution of the CIS is 400 dpi.

At step S222, the AFE 68E judges whether the LED control end condition is satisfied or not. If it is judged at step S222 that the LED control end condition is not satisfied (S222: no), the process returns to step S220. If it is judged at step S222 that the LED control end condition is satisfied (S222: yes), the lighting control process is finished.

Where a speed for 400 dpi is employed as a speed for low resolution, conventionally, as exemplified in FIG. 9, triggers are output at fixed (monotonic) intervals irrespective of where each cycle stands in the circulation color order and the LEDs 60 are turned on in the circulation color order in response to the respective triggers. In contrast, in the exemplary embodiment, in the case where a speed for 400 dpi is employed as a speed for low resolution, the output interval of triggers belonging to adjoining cycles is different from the output interval of triggers within a cycle (exemplified in FIG. 10). That is, because of steps S212-S222, in each cycle, triggers are output at the first turn-on intervals. The first trigger of the next cycle is output when the second turn-on interval has elapsed from the output of the last trigger of the current cycle. The LEDs 60 are turned on in the circulation color order in response to respective triggers.

Next, referring to FIG. 8, a description will be made of a reading control process that is executed by the AFE 68E when a scan start instruction is received by the UI unit 18C.

Figure 8:
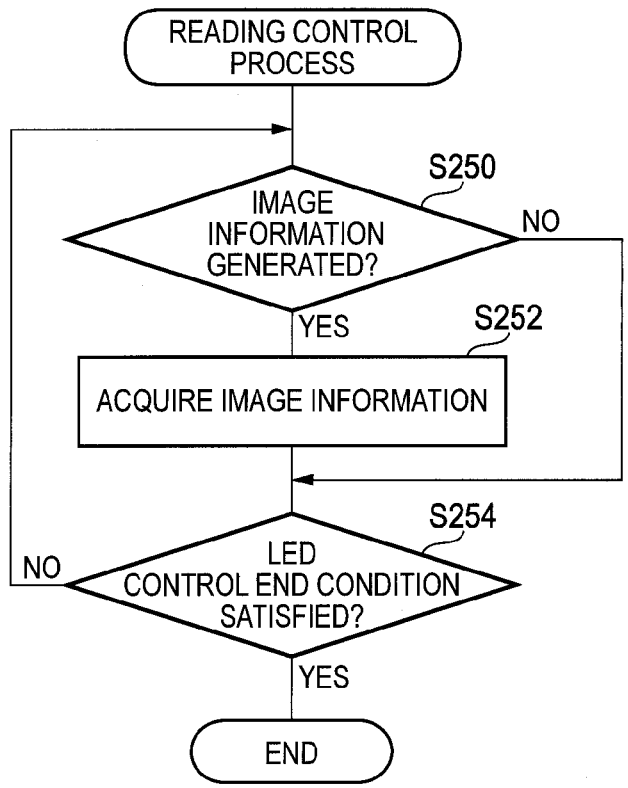
FIG. 8 is a flowchart of an example reading control process according to the first exemplary embodiment.

In the reading control process shown in FIG. 8, first, at step S250, the AFE 68E judges whether or not image information has been generated by the photoelectric conversion elements 66. For example, this is done by judging whether a time has elapsed or not that is predetermined as a time to be taken from output of one trigger to generation of image information by the photoelectric conversion elements 66.

If it is judged at step S250 that image information has been generated by the photoelectric conversion elements 66 (S250: yes), the process moves to step S252. If it is judged at step S250 that image information has not been generated yet by the photoelectric conversion elements 66 (S250: no), the process moves to step S254.

At step S252, the AFE 68E reads part of an image by acquiring the image information from the photoelectric conversion elements 66. Then the process moves to step S254.

At step S254, the AFE 68E judges whether an LED control end condition is satisfied or not. If it is judged at step S254 that the LED control end condition is not satisfied (S254: no), the process returns to step S250. If it is judged at step S254 that the LED control end condition is satisfied (S254: yes), the reading control process is finished.

Figure 11:
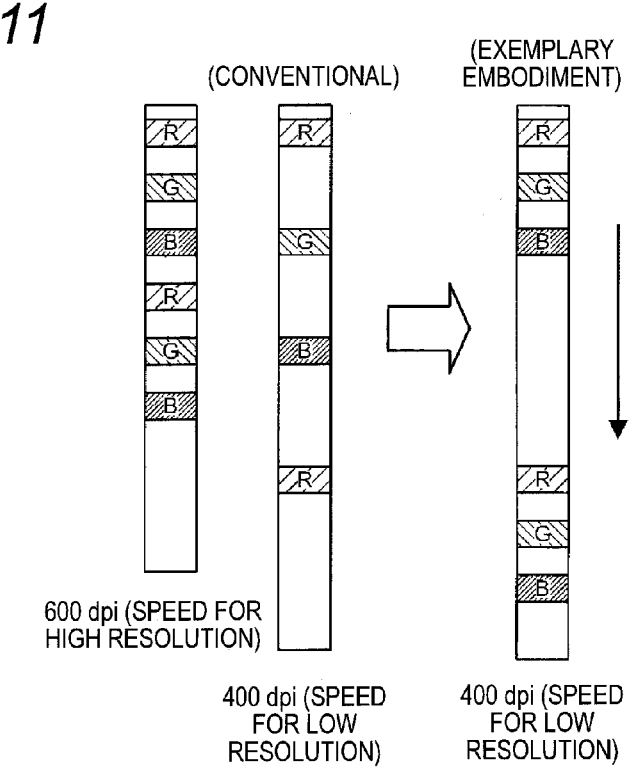
FIG. 11 is a conceptual diagram showing example reading intervals employed in the case of a speed for high resolution, example reading intervals employed conventionally in the case of a speed for low resolution, and example reading intervals employed in the first exemplary embodiment (the CIS is used) in the case of a speed for low resolution.

When the reading control process is executed as steps S204-S208 of the lighting control process are executed, image portions are read in the circulation color order at fixed (monotonic) reading intervals irrespective of where each cycle stands in the circulation color order. That is, for example, in the case where the movement speed of the CIS 52A relative to a document page 36 is 600 dpi which is a speed for high resolution, the reading intervals between image portions of the respective colors that are circulated in the prescribed order are fixed (monotonic) as shown in FIG. 11. This reading interval is equal to the trigger output interval indicated by the first output interval information.

On the other hand, where a speed for 400 dpi is employed as a speed for low resolution, conventionally, as exemplified in FIG. 11, image portions are likewise read in the circulation color order at fixed (monotonic) reading intervals irrespective of where each cycle stands in the circulation color order. However, in this case, the reading intervals between image portions of the respective colors that are circulated in the prescribed order are longer than in a case that the movement speed of the CIS 52A relative to a document page 36 is a speed for high resolution.

In contrast, when the reading control process is executed as steps S212-S222 are executed, as exemplified in FIG. 11, the reading intervals in each cycle are the same as in the case where the movement speed of the CIS 52A relative to a document page 36 is a speed for high resolution. But the reading interval from reading of the last color of each cycle to reading of the first color of the next cycle is longer than the reading interval of the case that the movement speed of the CIS 52A relative to a document page 36 is a speed for high resolution. That is, the reading interval from reading of the last color of each cycle to reading of the first color of the next cycle is equal to the trigger output interval indicated by the second output interval information.

Although in the exemplary embodiment the illumination intervals between R, G, and B light beams in each cycle are set identical (as exemplified in FIG. 11), the invention is not limited to such a case. For example, in the case of a circulation RGB→RGB→RGB→RGB . . . , the illumination intervals between adjoining ones (R and G or G and B) of R, G, and B light beams in each cycle (RGB) may be different from each other.

Although in the exemplary embodiment the resolution is changed by changing the relative speed, the invention is not limited to such a case. For example, the invention holds even in the case that the resolution is changed with the relative speed kept constant as long as the relationship between the conventional illumination intervals shown in FIG. 11 and the illumination intervals according to the exemplary embodiment shown in FIG. 11 is maintained.

Although in the exemplary embodiment image reading by the CIS 52A is performed by moving the CIS 52A relative to a document page 36 placed on the platen glass 38C, the invention is not limited to such a case. For example, the lighting control process may be executed in a case that image reading by the CIS 52A is performed by conveying a document page 36 with the document feeder 32A. That is, the lighting control process may be executed in a case that image reading by the CIS 52A is performed in a state that the CIS 52A is being moved relative to a document page 36.

Although in the exemplary embodiment the first turn-ob interval is fixed irrespective of the movement speed of the CIS 52A relative to a document page 36, the invention is not limited to such a case. For example, the first turn-ob interval may be varied according to the movement speed of the CIS 52A relative to a document page 36.

The lighting control process and the reading control process described in the above exemplary embodiment are just examples. It goes without saying that such modifications as deletion of unnecessary steps, addition of new steps, and change of execution order of steps are possible without departing from the spirit and scope of the invention. Although the individual steps of each of the lighting control process and the reading control process described in the above exemplary embodiment are executed by the AFE 68E, they may be implemented by a software configuration using a computer by running a program. Furthermore, the individual steps of each of various kinds of processes may be implemented by a combination of a hardware configuration and a software configuration.

Figure 12:
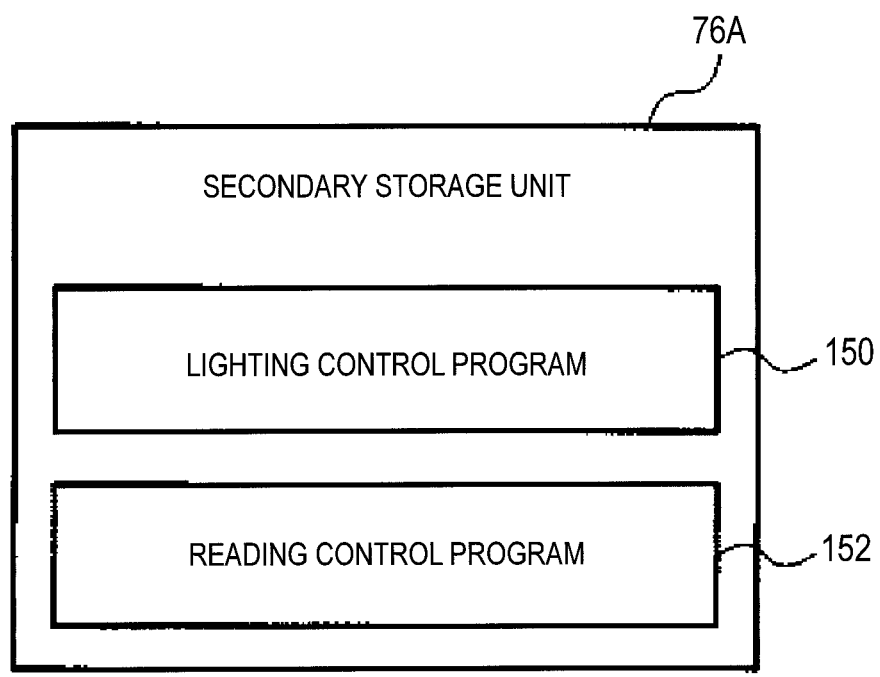
FIG. 12 is a conceptual diagram showing a secondary storage unit that is stored with a lighting control program and a reading control program in the first exemplary embodiment.

As shown in FIG. 12, an example method for implementing the individual steps of each of the lighting control process and the reading control process described in the above exemplary embodiment by a software configuration is to store a lighting control program 150 and a reading control program 152 in the secondary storage unit 76A in advance. The CPU 72 causes the AFE 68E to execute the individual steps of each of the lighting control process and the reading control process by running the lighting control program 150 and the reading control program 152 stored in the secondary storage unit 76A.

Although in FIG. 12 the lighting control program 150 and the reading control program 152 stored in the secondary storage unit 76A, they need not always be stored in the secondary storage unit 76A from the beginning. For example, first, the lighting control program 150 and the reading control program 152 may be stored in a portable storage medium to be used being connected to the image forming apparatus 10 such as an SSD (solid-state drive), an IC card, a magneto-optical disc, or a CD-ROM. The CPU 72 acquires the lighting control program 150 and the reading control program 152 from the portable storage medium and runs them. As another alternative, the lighting control program 150 and the reading control program 152 may be stored in a storage unit of an external computer such as a server to be connected to the image forming apparatus 10 via a communication medium. In this case, the CPU 72 acquires the lighting control program 150 and the reading control program 152 from the external computer and runs them.

Although in the exemplary embodiment pieces of image information of the three colors R, G, and B are generated by illuminating the image recording area of a document page 36 with light beams of R, G, and B emitted from the respective LEDs 60, the invention is not limited to such a case. For example, pieces of image information of yellow (Y), magenta (M), and cyan (C) may be generated by illuminating the image recording area of a document page 36 with light beams of Y, M, and C emitted from respective light sources such as LEDs. That is, pieces of image information of predetermined plural colors may be generated by illuminating the image recording area of a document page 36 with light beams of the predetermined plural colors emitted from respective LEDs.

Exemplary Embodiment 2

Figure 13:
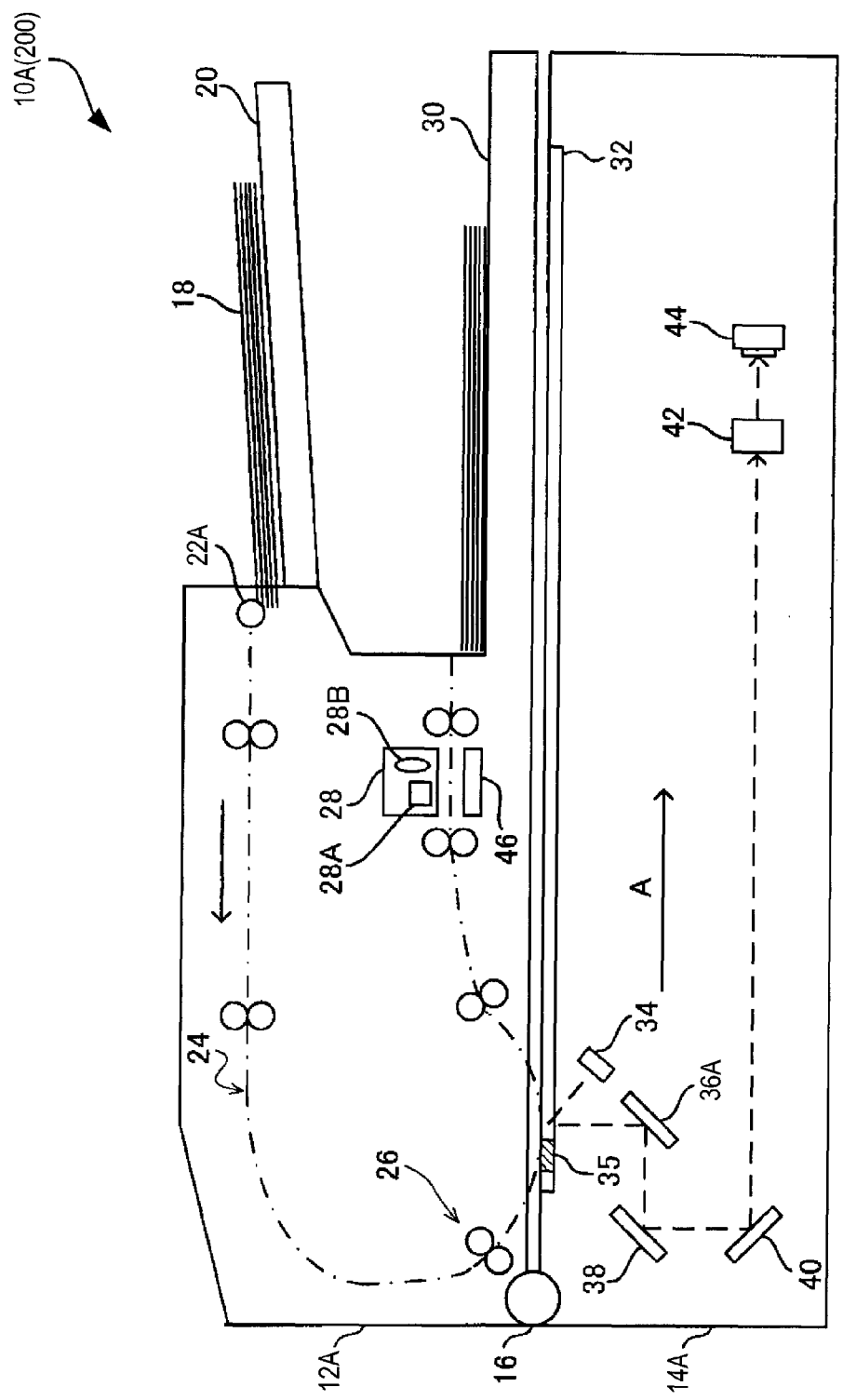
FIG. 13 is a schematic side view showing an example configuration of a structural aspect of image reading apparatus according to second and third exemplary embodiments.

As shown in FIG. 13, an example image reading apparatus 10A according to a second exemplary embodiment includes a document feeder 12A (dual auto document feeder (DADF)) and a front surface image reading unit 14A.

The document feeder 12A includes a document stage 20, plural conveying roll pairs 26, a back surface image reading unit 28, a document ejection stage 30, and a reference plate 46. Document pages 18 on which images are recorded are stacked on the document stage 20. A pickup roll 22A and the plural conveying roll pairs 26 are disposed along a conveyance path 24. A document page 18 is picked up from the document stage 20 by the pickup roll 22A and then conveyed by the plural conveying roll pairs 26. A document page 18 that has been subjected to reading processing by at least one of the front surface image reading unit 14A and the back surface image reading unit 28 is ejected to the document ejection stage 30. The document page 18 is an example of the recording medium of the invention.

The back surface image reading unit 28 includes a back surface line sensor 28A and a back surface lamp 28B which is an example back surface illumination unit of the invention. The back surface lamp 28B, which is long in the main scanning direction, illuminates the top surface of the reference plate 46 or the back surface of a document page 18 that is passing over the reference plate 46.

The back surface line sensor 28A reads an image on the back surface of a document page 18 or the top surface of the reference plate 46 through photoelectric conversion by receiving, pixel by pixel, reflection light produced by illuminating the back surface of the document page 18 or the top surface of the reference plate 46 with the back surface lamp 28B that is turned on, and outputs resulting reading data.

The reference plate 46 is a white plate that is long in the main scanning direction, and is disposed so as to be opposed to the back surface image reading unit 28. An example of the reference plate 46 is a white resin plate or a metal plate that is painted in white.

The front surface image reading unit 14A is equipped with a platen glass 32 to which a reference plate 35 is attached. The reference plate 35 is a white plate that is long in the main scanning direction.

A front surface reading position which is a position where to read an image on the front surface of a document page 18 being conveyed by the document feeder 12A exists adjacent to the reference plate 35 on the top surface of the platen glass 32. A front surface lamp 34 which is an example front surface illumination unit of the invention, a first reflection mirror 36A, a second reflection mirror 38, and a third reflection mirror 40 are disposed under the platen glass 32.

The front surface lamp 34, which is long in the main scanning direction, illuminates the bottom surface of the reference plate 35 or the front surface of a document page 18 that is passing the front surface reading position.

The first reflection mirror 36A receives reflection light coming from the front surface of a document page 18 or the bottom surface of the reference plate 35 and reflects it toward the second reflection mirror 38. The second reflection mirror 38 receives the reflection light coming from the first reflection mirror 36A and reflects it toward the third reflection mirror 40. The third reflection mirror 40 receives the reflection light coming from the second reflection mirror 38 and reflects it toward a lens 42.

The front surface image reading unit 14A is equipped with a front surface line sensor 44. Reflection light that is produced by illuminating the front surface of a document page 18 or the bottom surface of the reference plate 35 with the front surface lamp 34 that is turned on shines on the front surface line sensor 44 via the reflection mirrors 36A, 38, and 40 and the lens 42. The front surface line sensor 44 reads an image on the front surface of the document page 18 or the bottom surface of the reference plate 35 through photoelectric conversion by receiving the incident reflection light pixel by pixel, and outputs resulting reading data.

In the above-configured image reading apparatus 10A according to the second exemplary embodiment, document pages 18 placed on the document stage 20 are picked up by the pickup roll 22A one by one and fed to the conveyance path 24. A document page 18 that has been fed to the conveyance path 24 is conveyed to the front surface reading position of the front surface image reading unit 14A by the conveying roll pairs 26, whereby an image on the front surface of the document page 18 is read by the front surface image reading unit 14A. Then the document page 18 is conveyed to the back surface image reading unit 28 which is disposed downstream of the front surface reading position in the conveying direction. An image on the back surface of the document page 18 is read by the back surface image reading unit 28, and the document page 18 is then ejected to the document ejection stage 30.

In the image reading apparatus 10A according to the second exemplary embodiment, the front surface lamp 34, the first reflection mirror 36A, the second reflection mirror 38, and the third reflection mirror 40 are movable in the auxiliary scanning direction (in the example shown in FIG. 13, in the direction indicated by arrow A and the direction opposite to it). Therefore, an image recorded on a document page 18 that is placed on the top surface of the platen glass 32 can be read by moving the front surface lamp 34 that is turned on, the first reflection mirror 36A, the second reflection mirror 38, and the third reflection mirror 40 in the auxiliary scanning direction.

The image reading apparatus 10A according to the second exemplary embodiment employs a CCD line sensor that consists of plural CCDs (charge-coupled devices) as an example of each of the back surface line sensor 28A and the front surface line sensor 44. However, the invention is not limited to such a case; for example, such a solid-state imaging device as a CMOS (complementary metal-oxide-semiconductor) image sensor may be employed. Instead of using the front surface line sensor 44, a CIS like the back surface image reading unit 28 may be used, in which case the CIS is moved in the direction indicated by arrow A. In this case, the first reflection mirror 36A, the second reflection mirror 38, the third reflection mirror 40, and the lens 42 are not necessary.

The image reading apparatus 10A according to the second exemplary embodiment employs an LED(s) (light-emitting diode(s)) as an example of each of the back surface lamp 28B and the front surface lamp 34. However, the invention is not limited to such a case; for example, a fluorescent lamp may be used. For example, the LED(s) may be of such a type that LEDs are arranged in the main scanning direction or an LED is disposed at an end in the main scanning direction.

Figure 14:
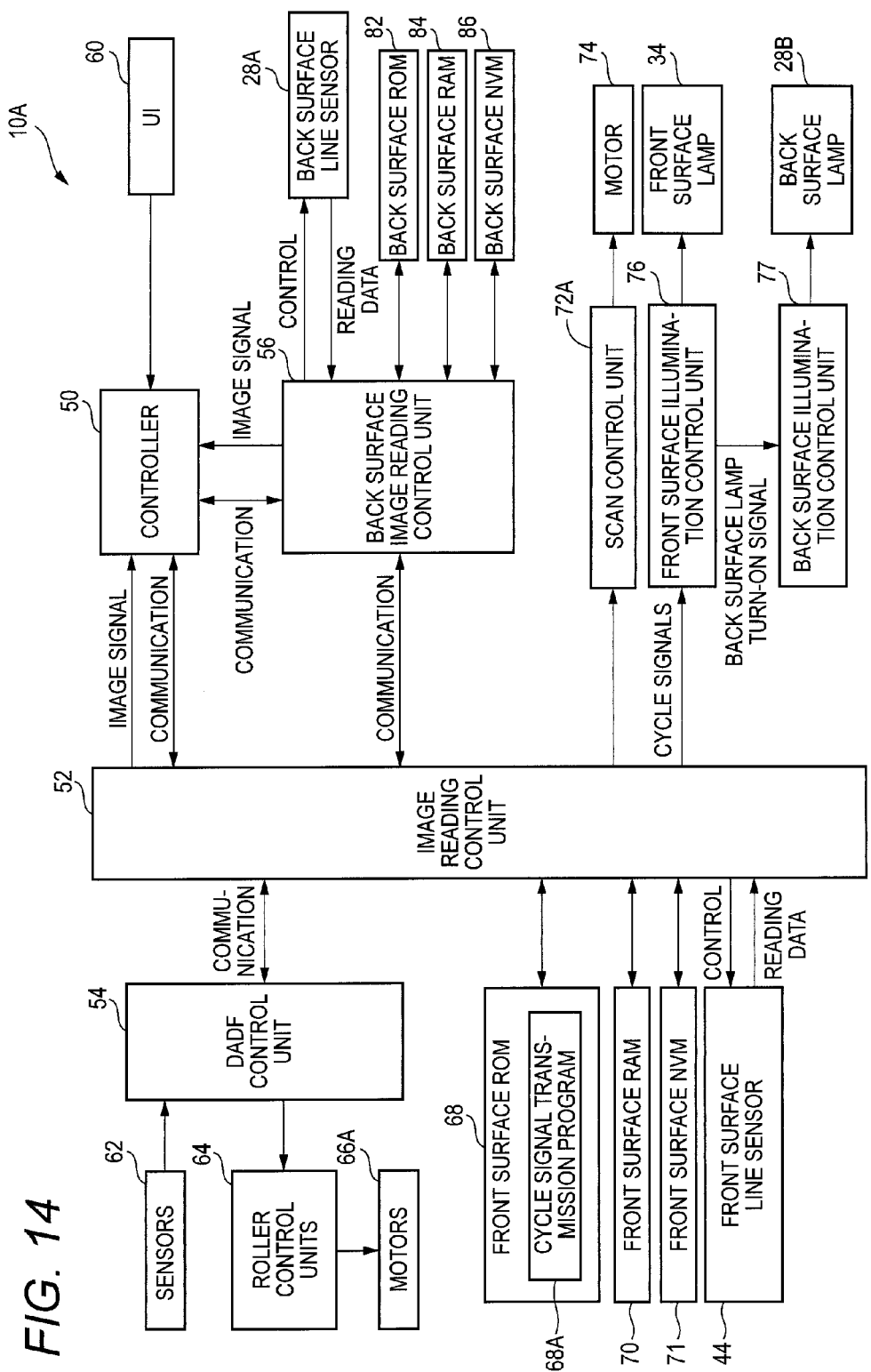
FIG. 14 is a block diagram showing an example configuration of an electric system of the image reading apparatus according to the second exemplary embodiment.

For example, as shown in FIG. 14, the image reading apparatus 10A includes a controller 50, an image reading control unit 52 which is an example output unit of the invention, a DADF control unit 54, a back surface image reading control unit 56, and a UI (user interface) 60.

The controller 50 controls the whole of the image reading apparatus 10A. The controller 50 receives an image signal (reading data) from each of the image reading control unit 52 and the back surface image reading control unit 56. The controller 50 also receives a signal indicating a user instruction or the like from the UI 60.

The image reading control unit 52 controls the whole of an image reading process that is executed by the image reading apparatus 10A. More specifically, image reading control unit 52 controls the DADF control unit 54, the back surface image reading control unit 56, the front surface line sensor 44, a scan control unit 72A, and a front surface illumination control unit 76 which is an example control unit of the invention. In the second exemplary embodiment, the image reading control unit 52 is implemented as a CPU (central processing unit).

The image reading control unit 52 is connected to a front surface ROM (read-only memory) 68, a front surface RAM (random access memory) 70, and a front surface NVM (nonvolatile memory) 71. The front surface ROM 68 and the front surface NVM 71 are stored with various programs for reading of an image on the front surface of a document page 18 and various kinds of information etc. to be used for that purpose. The various programs include a cycle signal transmission program 68A which is stored in the front surface ROM 68 in the example of FIG. 14. The front surface RAM 70 is a memory that is used when the image reading control unit 52 operates. Various programs for reading of an image on the front surface of a document page 18 are developed temporarily in the front surface RAM 70. And various data that are necessary for reading of an image on the front surface of a document page 18 are stored temporarily in the front surface RAM 70.

Although in the example of FIG. 14 the cycle signal transmission program 68A is stored in the front surface ROM 68, it need not always be stored in the front surface ROM 68 from the beginning. For example, first, the cycle signal transmission program 68A may be stored in a portable storage medium to be used being connected to the image reading apparatus 10A such as an SSD (solid-state drive), an IC card, a magneto-optical disc, or a CD-ROM. The image reading control unit 52 acquires the cycle signal transmission program 68A from the portable storage medium and runs it. As another alternative, the cycle signal transmission program 68A may be stored in a storage unit of an external computer such as a server to be connected to the image reading apparatus 10A via a communication medium. In this case, the image reading control unit 52 acquires the cycle signal transmission program 68A from the external computer and runs it.

The scan control unit 72A performs a control relating to a scan for reading of a document page 18 and also controls a motor 74, which serves to move the front surface lamp 34 and the mirrors 36A, 38, and 40 shown in FIG. 13 together.

The front surface illumination control unit 76 controls the front surface lamp 34. The image reading apparatus 10A is equipped with a back surface illumination control unit 77 which is an example control means of the invention. The back surface illumination control unit 77 controls the back surface lamp 28B under the control of the front surface illumination control unit 76. Although in the second exemplary embodiment the front surface illumination control unit 76 and the back surface illumination control unit 77 are implemented as an ASIC (application-specific integrated circuit), they may be implemented as a CPU.

The DADF control unit 54 controls the document feeder 12A. The DADF control unit 54 receives information from sensors 62 and roller control units 64 which control respective motors 66A for controlling the above-described pickup roll 22A and conveying roll pairs 26. An example of the sensors 62 is a sensor for detecting, for example, whether or not the document feeder 12A is opened over the front surface image reading unit 14A.

The back surface image reading control unit 56 controls the back surface image reading unit 28. The back surface image reading control unit 56 is connected to a back surface ROM 82, a back surface RAM 84, and a back surface NVM 86.

The back surface ROM 82 and the back surface RAM 84 are stored with various programs for operation of the back surface image reading control unit 56 and various kinds of information etc. to be used for that purpose. The back surface RAM 84 is a memory that is used when the back surface image reading control unit 56 operates.

Next, referring to FIG. 15, a description will be made of a cycle signal transmission process which is executed by the image reading control unit 52 when an image reading start instruction that is an instruction to start reading of images on the front surface and the back surface of a document page 18 placed on the document stage 20 is received by the UI 60. The cycle signal transmission process is executed as the image reading control unit 52 runs the cycle signal transmission program 68A.

Figure 15:
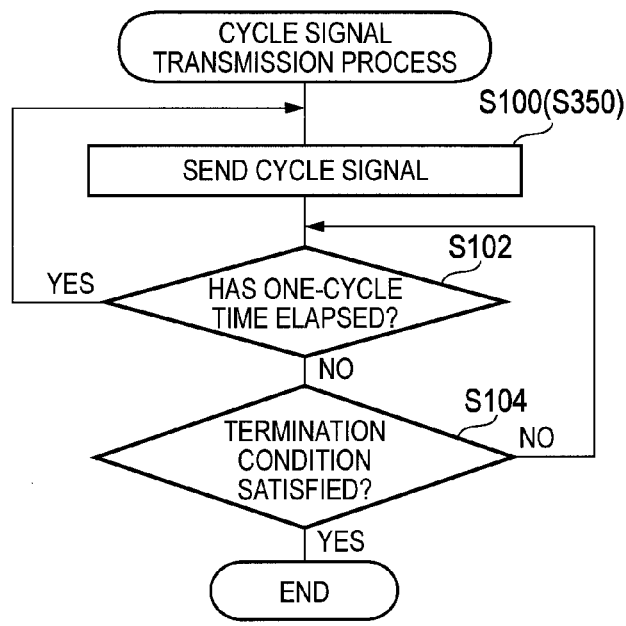
FIG. 15 is a flowchart of an example cycle signal transmission process according to the second exemplary embodiment and a fourth exemplary embodiment.
Figure 18:
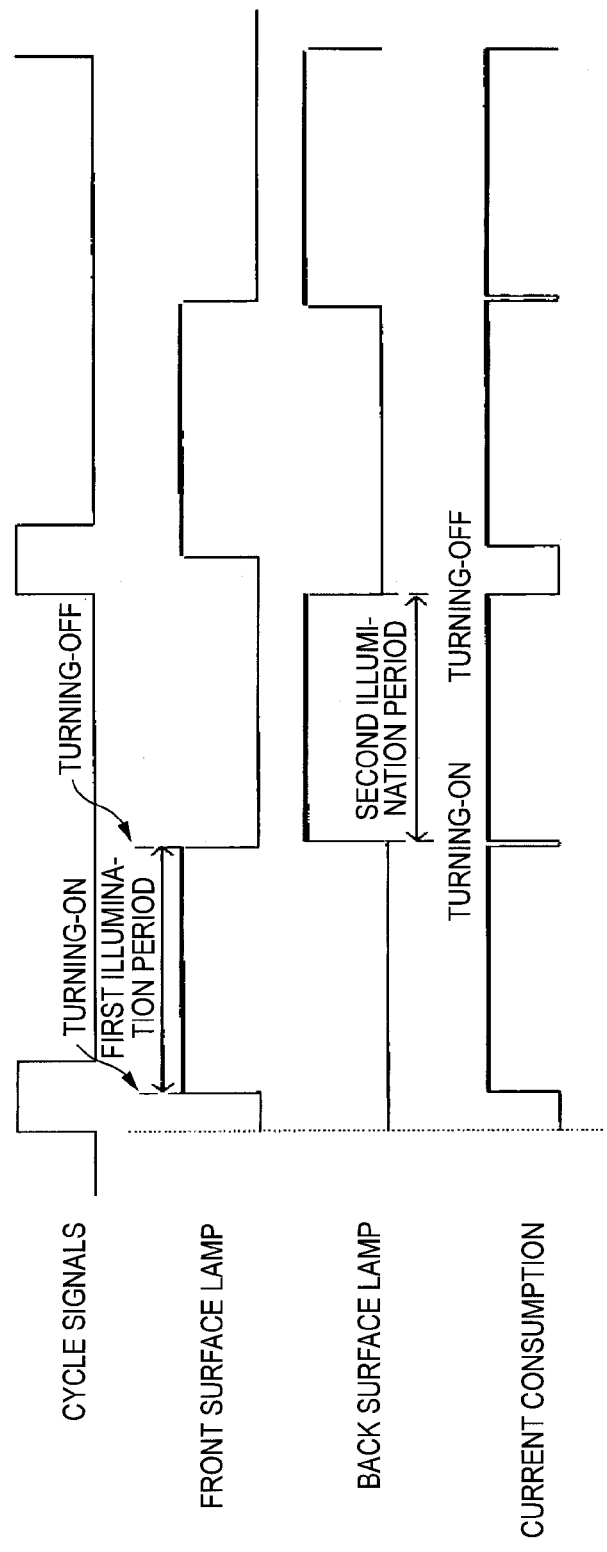
FIG. 18 is a time chart showing example state changes of cycle signals, light emission periods of a front surface lamp, light emission periods of a back surface lamp, and a current consumption in the second exemplary embodiment.

In the cycle signal transmission process shown in FIG. 15, first, at step S100, the image reading control unit 52 sends a cycle signal to the front surface illumination control unit 76 (exemplified in FIG. 14). Then the process moves to step S102. Cycle signals are signals that define illumination cycles of respective sets of a first illumination period and a second illumination period. For example, as shown in FIG. 18, the term "first illumination period" means an on-period of the front surface lamp 34, that is, a period in which the front surface lamp 34 emits light. And the term "second illumination period" means an on-period of the back surface lamp 28B, that is, a period in which the back surface lamp 28B emits light. The interval between cycle signals, that is, a cycle defined by the cycle signals is determined according to an image reading resolution. For example, the cycle becomes shorter as the image reading resolution becomes higher.

At step S102, the image reading control unit 52 judges whether or not a one-cycle time has elapsed from the end of execution of step S100. If it is judged at step S102 that the one-cycle time has elapsed from the end of execution of step S100 (S102: yes), the process returns to step S100. If it is judged at step S102 that the one-cycle time has not elapsed yet from the end of execution of step S100 (S102: no), the process moves to step S104.

At step S104, the image reading control unit 52 judges whether a condition for termination of the cycle signal transmission process is satisfied or not. An example of the condition for termination of the cycle signal transmission process is that reading of images on the front surface and the back surface of every one of document pages 18 stacked on the document stage 20 should have been completed. Other examples are that an image reading termination instruction to terminate reading of images on the front surface and the back surface of every one of document pages 18 stacked on the document stage 20 should have been received by the UI 60, and that a failure of the image reading apparatus 10A should have been detected by the controller 50, the image reading control unit 52, the DADF control unit 54, or the back surface image reading control unit 56.

If it is judged at step S104 that the condition for termination of the cycle signal transmission process is not satisfied (S104: no), the process returns to step S102. If it is judged at step S104 that the condition for termination of the cycle signal transmission process is satisfied (S104: yes), the cycle signal transmission process is finished. The transmission of cycle signals, that is, horizontal sync signals LSync, may be continued all the time.

Next, referring to FIG. 16, a description will be made of a first lighting control process which is executed by the front surface illumination control unit 76 when an image reading start instruction is received by the UI 60.

Figure 16:
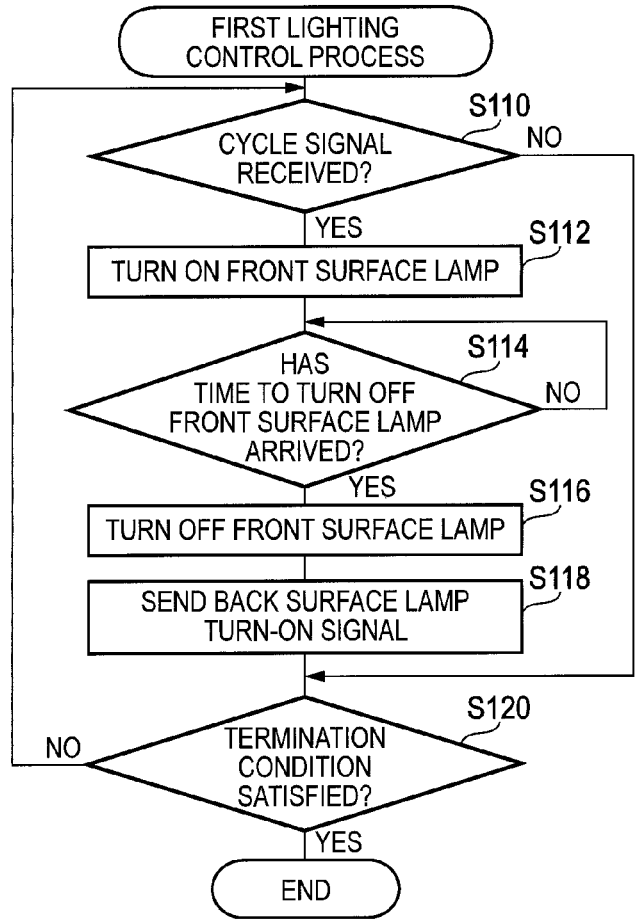
FIG. 16 is a flowchart of an example first lighting control process according to the second exemplary embodiment.

In the first lighting control process shown in FIG. 16, first, at step S110, the front surface illumination control unit 76 judges whether or not it has received a cycle signal transmitted as a result of execution of step S100 of the cycle signal transmission process. If it is judged at step S110 that a cycle signal has not been received yet (S110: no), the process moves to step S120. If it is judged at step S110 that a cycle signal has been received (S110: yes), the process moves to step S112.

At step S112, the front surface illumination control unit 76 turns on the front surface lamp 34. Then the process moves to step S114. As exemplified in FIG. 18, turning-on of the front surface lamp 34 as a result of execution of step S112 means a start of a first illumination period.

At step S114, the front surface illumination control unit 76 judges whether a time to turn off the front surface lamp 34 has arrived or not. For example, the term "time to turn off the front surface lamp 34" means a time when a half-cycle time has elapsed from a rise of the cycle signal. If it is judges at step S114 that the time to turn off the front surface lamp 34 has not arrived yet (S114: no), step S114 is executed again. If it is judges at step S114 that the time to turn off the front surface lamp 34 has arrived (S114: yes), the process moves to step S116.

At step S116, the front surface illumination control unit 76 turns off the front surface lamp 34. Then the process moves to step S118. As exemplified in FIG. 18, turning-off of the front surface lamp 34 as a result of execution of step S116 means that the first illumination period has finished and that the pulse width of the pulse width that defines the first illumination period has been modulated.

At step S118, as exemplified in FIG. 14, the front surface illumination control unit 76 sends a back surface lamp turn-on signal which is an instruction to turn on the back surface lamp 28B to the back surface illumination control unit 77. Then the process moves to step S120.

At step S120, the front surface illumination control unit 76 judges whether a condition for termination of the first lighting control process is satisfied or not. An example of the condition for termination of the first lighting control process is the same condition as the condition for termination of the cycle signal transmission process. If it is judged at step S120 that the condition for termination of the first lighting control process is not satisfied (S120: no), the process returns to step S110. If it is judged at step S120 that the condition for termination of the first lighting control process is satisfied (S120: yes), the first lighting control process is finished.

Next, referring to FIG. 17, a description will be made of a second lighting control process which is executed by the back surface illumination control unit 77 when the front surface illumination control unit 76 has started execution of the first lighting control process.

Figure 17:
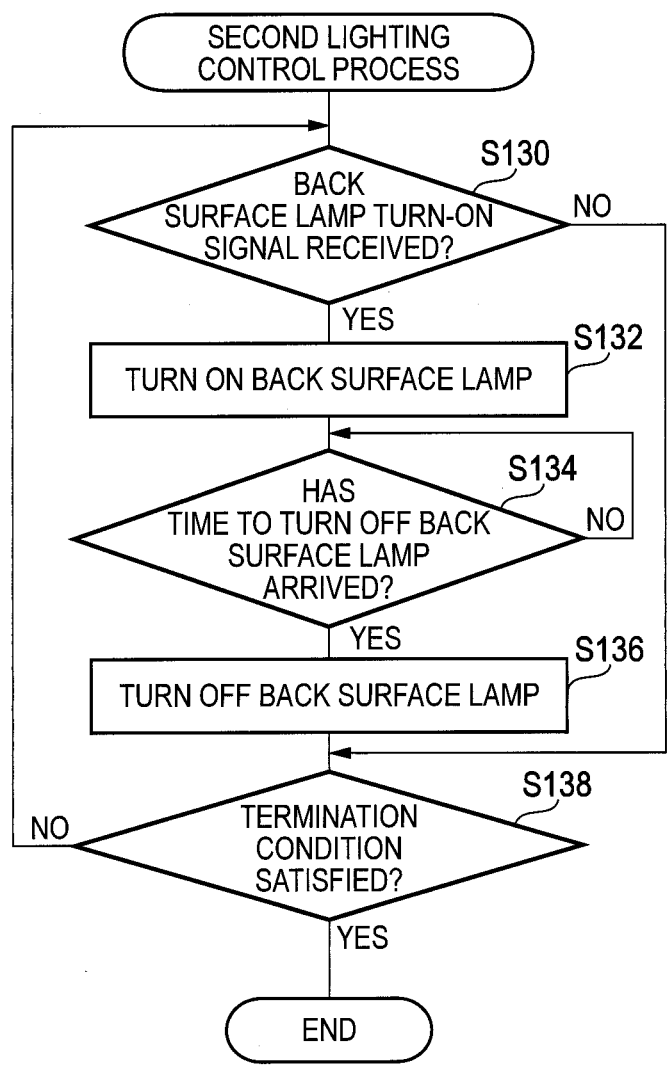
FIG. 17 is a flowchart of an example second lighting control process according to the second exemplary embodiment.

In the second lighting control process shown in FIG. 17, first, at step S130, the back surface illumination control unit 77 judges whether or not it has received a back surface lamp turn-on signal transmitted as a result of execution of step S118 of the first lighting process. If it is judged at step S130 that a back surface lamp turn-on signal has not been received yet (S130: no), the process moves to step S138. If it is judged at step S130 that a back surface lamp turn-on signal has been received (S130: yes), the process moves to step S132.

At step S132, the back surface illumination control unit 77 turns on the back surface lamp 28B. Then the process moves to step S134. As exemplified in FIG. 18, turning-on of the back surface lamp 28B as a result of execution of step S132 means that a second illumination period has started and that a pulse width that defines the second illumination period has been modulated.

At step S134, the back surface illumination control unit 77 judges whether a time to turn off the back surface lamp 28B has arrived or not. As exemplified in FIG. 18, the term "time to turn off the back surface lamp 28B" means a time when a one-cycle time has elapsed from a rise of the cycle signal. If it is judged at step S134 that the time to turn off the back surface lamp 28B has not arrived yet (S134: no), step S134 is executed again. If it is judged at step S134 that the time to turn off the back surface lamp 28B has arrived (S134: yes), the process moves to step S136.

At step S136, the back surface illumination control unit 77 turns off the back surface lamp 28B. Then the process moves to step S138. Turning-off of the back surface lamp 28B as a result of execution of step S136 means that the second illumination period has finished and that the pulse width that defines the second illumination period has been modulated.

At step S138, the back surface illumination control unit 77 judges whether a condition for termination of the second lighting control process is satisfied or not. An example of the condition for termination of the second lighting control process is the same condition as the condition for termination of the cycle signal transmission process. If it is judged at step S138 that the condition for termination of the second lighting control process is not satisfied (S138: no), the process returns to step S130. If it is judged at step S138 that the condition for termination of the second lighting control process is satisfied (S138: yes), the second lighting control process is finished.

Although in the second exemplary embodiment the second lighting control process shown in FIG. 17 is executed, the invention is not limited to such a case. A simpler procedure is possible in which steps S132, S134, and S136 is executed forcibly when a half-cycle time has elapsed from a rise of a cycle signal. Where image reading is performed by a line-sequential method (described later), in an example shown in FIG. 33, a lighting process is executed in such a manner that each cycle is divided into six parts. In the example shown in FIG. 34, a lighting process is executed in such a manner that each cycle is divided into three parts.

As described above, in the image reading apparatus 10A, as exemplified in FIG. 18, overlap between the first illumination period and the second illumination period is avoided as a result of execution of the cycle signal transmission process, the first lighting control process, and the second lighting control process. Therefore, overlap between a period when a current is consumed by the front surface lamp 34 and a period when a current is consumed by the back surface lamp 28B is also avoided. As a result, according to the image reading apparatus 10A, increase of a current consumption in an illumination period is made smaller than in a case that overlap occurs between the first illumination period and the second illumination period.

Exemplary Embodiment 3

Whereas in the second exemplary embodiment the front surface lamp 34 and the back surface lamp 28B are turned on in response to a single sequence of cycle signals, in a third exemplary embodiment the front surface lamp 34 and the back surface lamp 28B are turned on in response to two sequences of cycle signals having different phases. In the third exemplary embodiment, constituent elements having the corresponding ones in the second exemplary embodiment will be given the same reference symbols as the latter and will not be described redundantly.

Figure 19:
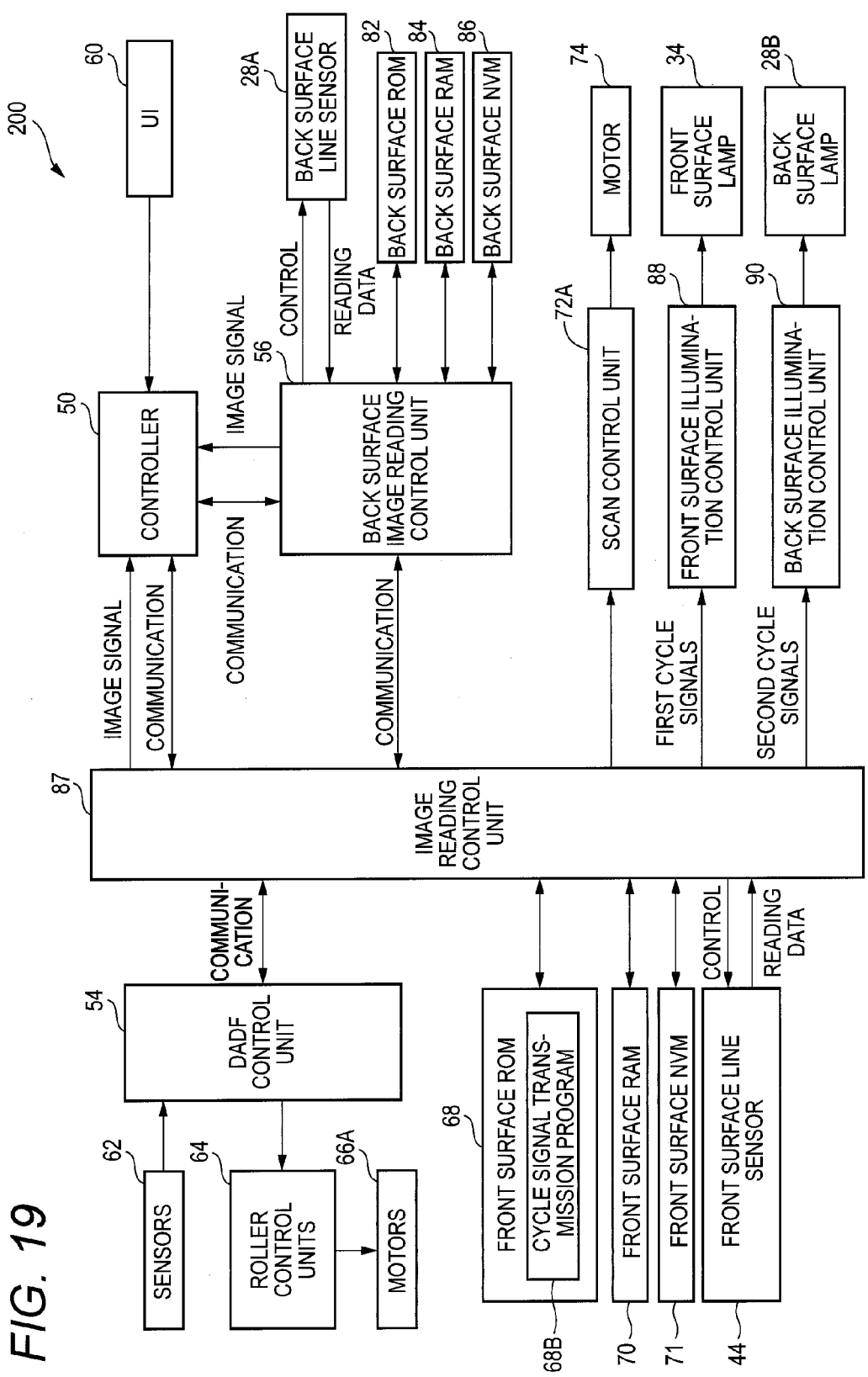
FIG. 19 is a block diagram showing an example configuration of an electric system of the image reading apparatus according to the third exemplary embodiment.

For example, as shown in FIG. 19, an image reading apparatus 200 according to the third exemplary embodiment is different from the image reading apparatus 10A according to the second exemplary embodiment in that a cycle signal transmission program 68B, instead of the cycle signal transmission program 68A, is stored in the front surface ROM 68, that an image reading control unit 87 replaces the image reading control unit 52, that a front surface illumination control unit 88 replaces the front surface illumination control unit 76, and that a back surface illumination control unit 90 replaces the back surface illumination control unit 77.

The image reading control unit 87 is different from the image reading control unit 52 in that the former sends first cycle signals and second cycle signals alternately. First cycle signals and second cycle signals are transmitted to the front surface illumination control unit 88 and the back surface illumination control unit 90, respectively.

The front surface illumination control unit 88 is different from the front surface illumination control unit 76 in that the former receives first cycle signals instead of cycle signals and does not send back surface lamp turn-on signals. The front surface illumination control unit 88 controls the front surface lamp 34 in response to the first cycle signals.

The back surface illumination control unit 90 is different from the back surface illumination control unit 77 in that the former receives second cycle signals instead of back surface lamp turn-on signals. The back surface illumination control unit 90 controls the back surface lamp 28B in response to the second cycle signals.

First cycle signals (exemplified in FIG. 23) are signals that define a light emission cycle of the front surface lamp 34, and are determined by an image reading resolution. Second cycle signals are signals that define a light emission cycle of the back surface lamp 28B, and are determined by the image reading resolution. Whereas the interval between first cycle signals and the interval between second cycle signals correspond to the intervals of cycle signals described in the second exemplary embodiment, there is a phase deviation of a half-cycle time between the first cycle signals and the second cycle signals.

Next, a cycle signal transmission process according to the third exemplary embodiment will be described with reference to FIG. 20. The cycle signal transmission process according to the third exemplary embodiment is executed as the image reading control unit 87 runs the cycle signal transmission program 68B.

Figure 20:
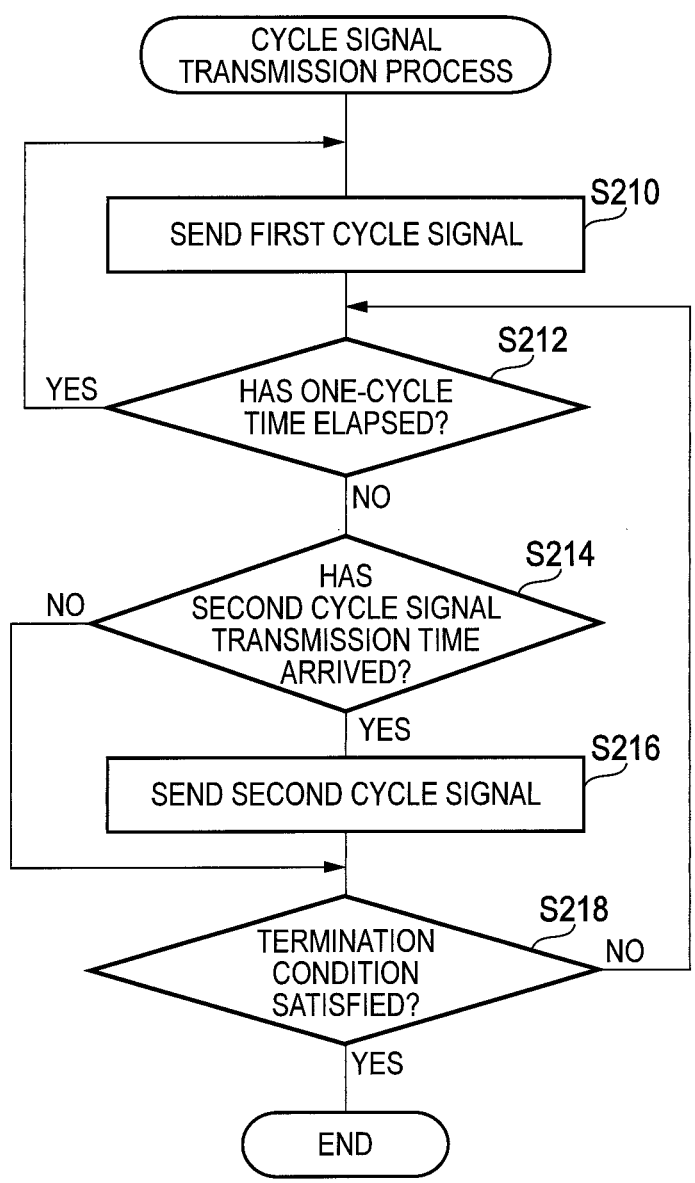
FIG. 20 is a flowchart of an example cycle signal transmission process according to the third exemplary embodiment.

In the cycle signal transmission process shown in FIG. 20, first, at step S210, the image reading control unit 87 sends a first cycle signal to the front surface illumination control unit 88 (exemplified in FIG. 19). Then the process moves to step S212.

At step S212, the image reading control unit 87 judges whether a one-cycle time that is defined by the first cycle signals has elapsed or not from the end of execution of step S210. If it is judged at step S212 that the one-cycle time has elapsed from the end of execution of step S210 (S212: yes), the process returns to step S210. If it is judged at step S212 that the one-cycle time has not elapsed yet from the end of execution of step S210 (S212: no), the process returns to step S214.

At step S214, the image reading control unit 87 judges whether a second cycle signal transmission time that is a time to send a second cycle signal has arrived or not. The term "second cycle signal transmission time" means a time when a half-cycle time has elapsed from the transmission of a first cycle signal. If it is judged at step S214 that the second cycle signal transmission time has not arrived yet (S214: no), the process moves to step S218. If it is judged at step S214 that the second cycle signal transmission time has arrived (S214: yes), the process moves to step S216.

At step S216, as exemplified in FIG. 19, the image reading control unit 87 sends a second cycle signal to the back surface illumination control unit 90. Then the process moves to step S218.

At step S218, the image reading control unit 87 judges whether a condition for termination of the cycle signal transmission process is satisfied. An example of the condition for termination of the cycle signal transmission process is the same condition as the condition for termination of the cycle signal transmission process described in the second exemplary embodiment.

If it is judged at step S218 that the condition for termination of the cycle signal transmission process is not satisfied (S218: no), the process returns to step S212. If it is judged at step S218 that the condition for termination of the cycle signal transmission process is satisfied (S218: yes), the cycle signal transmission process is finished.

Next, referring to FIG. 21, a description will be made of a first lighting control process according to the third exemplary embodiment which is executed when an image reading start instruction is received by the UI 60.

Figure 21:
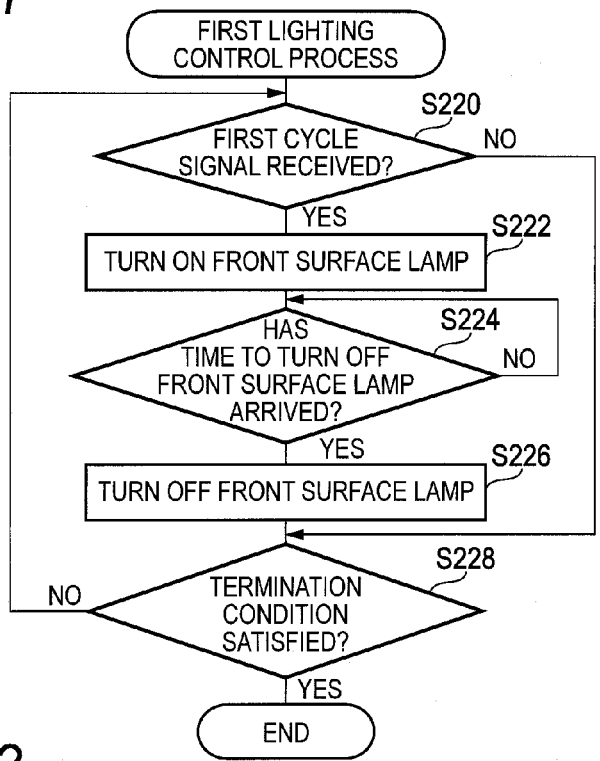
FIG. 21 is a flowchart of an example first lighting control process according to the third exemplary embodiment.

In the first lighting control process shown in FIG. 21, first, at step S220, the front surface illumination control unit 88 judges whether or not it has received a first cycle signal transmitted as a result of execution of step S210 of the cycle signal transmission process. If it is judged at step S220 that a first cycle signal has not been received yet (S220: no), the process moves to step S228. If it is judged at step S220 that a first cycle signal has been received (S220: yes), the process moves to step S222.

At step S222, the front surface illumination control unit 88 turns on the front surface lamp 34. Then the process moves to step S224. As exemplified in FIG. 23, turning-on of the front surface lamp 34 as a result of execution of step S222 means a start of a first illumination period.

At step S224, the front surface illumination control unit 88 judges whether a time to turn off the front surface lamp 34 has arrived or not. For example, as exemplified in FIG. 23, the term "time to turn off the front surface lamp 34" means the end of the first illumination period. An example of the time to turn off the front surface lamp 34 is a time when a half-cycle time has elapsed from a rise of the first cycle signal.

If it is judges at step S224 that the time to turn off the front surface lamp 34 has not arrived yet (S224: no), step S224 is executed again. If it is judges at step S224 that the time to turn off the front surface lamp 34 has arrived (S224: yes), the process moves to step S226.

At step S226, the front surface illumination control unit 88 turns off the front surface lamp 34. Then the process moves to step S228. As exemplified in FIG. 23, turning-off of the front surface lamp 34 as a result of execution of step S226 means that the first illumination period has finished.

At step S228, the front surface illumination control unit 88 judges whether a condition for termination of the first lighting control process is satisfied or not. An example of the condition for termination of the first lighting control process is the same condition as the condition for termination of the cycle signal transmission process described in the second exemplary embodiment. If it is judged at step S228 that the condition for termination of the first lighting control process is not satisfied (S228: no), the process returns to step S220. If it is judged at step S228 that the condition for termination of the first lighting control process is satisfied (S228: yes), the first lighting control process is finished.

Next, referring to FIG. 22, a description will be made of a second lighting control process according to the third exemplary embodiment which is executed by the back surface illumination control unit 90 when an image reading start instruction is received by the UI 60.

Figure 22:
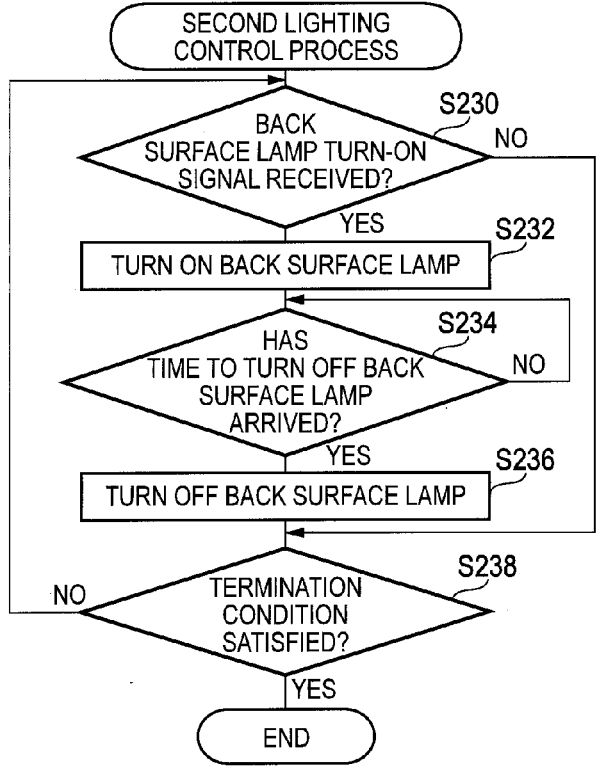
FIG. 22 is a flowchart of an example second lighting control process according to the third exemplary embodiment.

In the second lighting control process shown in FIG. 22, first, at step S230, the back surface illumination control unit 90 judges whether or not it has received a second cycle signal transmitted as a result of execution of step S216 of the cycle signal transmission process. If it is judged at step S230 that a second cycle signal has not been received yet (S230: no), the process moves to step S238. If it is judged at step S230 that a second cycle signal has been received (S230: yes), the process moves to step S232.

At step S232, the back surface illumination control unit 90 turns on the back surface lamp 28B. Then the process moves to step S234. Turning-on of the back surface lamp 28B as a result of execution of step S232 means that a second illumination period has started (exemplified in FIG. 23).

At step S234, the back surface illumination control unit 90 judges whether a time to turn off the back surface lamp 28B has arrived or not. As exemplified in FIG. 23, the term "time to turn off the back surface lamp 28B" means a time of the end of the second illumination period. An example of the time to turn off the back surface lamp 28B (the term used in step S234) is a time when a half-cycle time has elapsed from the rise of the second cycle signal.

If it is judged at step S234 that the time to turn off the back surface lamp 28B has not arrived yet (S234: no), step S234 is executed again. If it is judged at step S234 that the time to turn off the back surface lamp 28B has arrived (S234: yes), the process moves to step S236.

At step S236, the back surface illumination control unit 90 turns off the back surface lamp 28B. Then the process moves to step S238. Turning-off of the back surface lamp 28B as a result of execution of step S236 means that the second illumination period has finished (exemplified in FIG. 23).

At step S238, the back surface illumination control unit 90 judges whether a condition for termination of the second lighting control process is satisfied or not. An example of the condition for termination of the second lighting control process is the same condition as the condition for termination of the cycle signal transmission process described in the second exemplary embodiment. If it is judged at step S238 that the condition for termination of the second lighting control process is not satisfied (S238: no), the process returns to step S230. If it is judged at step S238 that the condition for termination of the second lighting control process is satisfied (S238: yes), the second lighting control process is finished.

Figure 23:
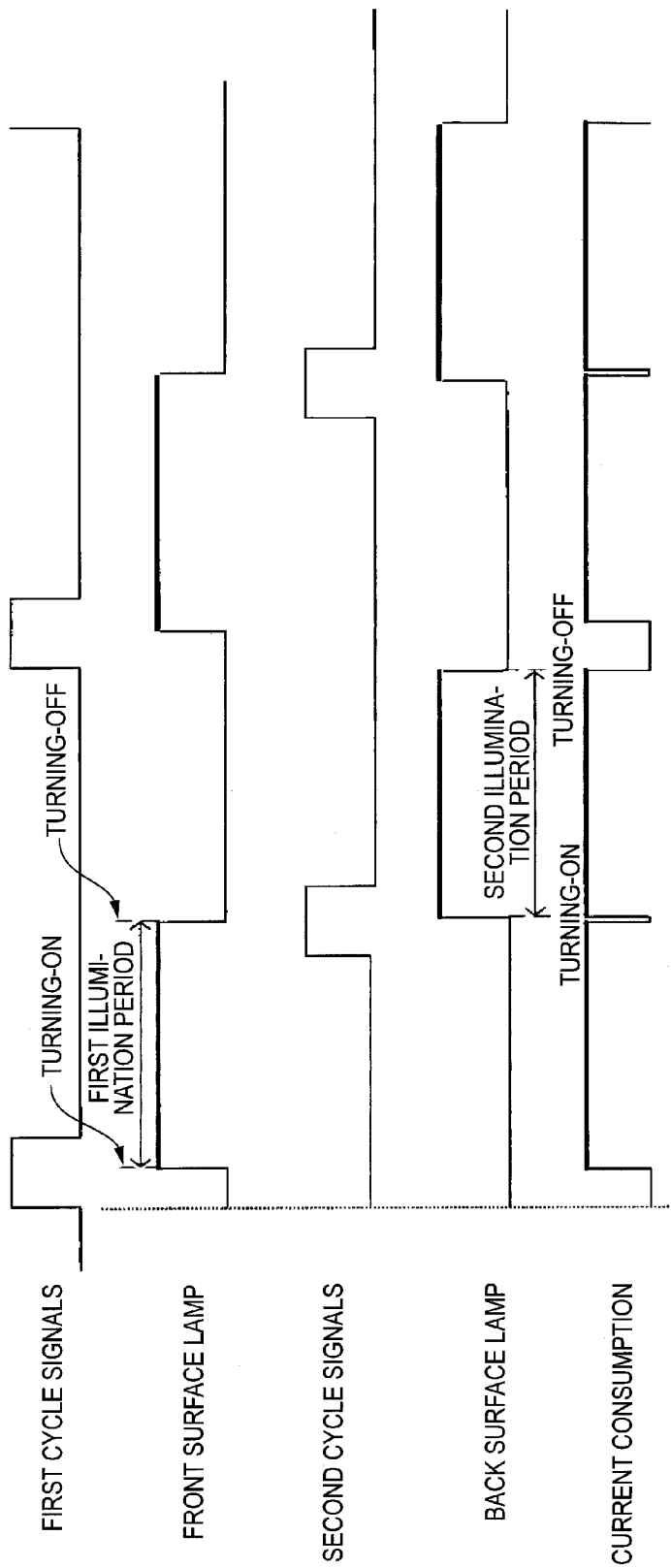
FIG. 23 is a time chart showing example state changes of first cycle signals, light emission periods of a front surface lamp, second cycle signals, light emission periods of a back surface lamp, and a current consumption in the third exemplary embodiment.

As described above, in the image reading apparatus 200, as exemplified in FIG. 23, overlap between the first illumination period and the second illumination period is avoided as a result of execution of the cycle signal transmission process, the first lighting control process, and the second lighting control process. Therefore, as in the second exemplary embodiment, overlap between current consumption periods is also avoided.

Although in the third exemplary embodiment overlap between the first illumination period and the second illumination period is avoided by controlling the pulse width that defines the second illumination period, the invention is not limited to such a case. For example, overlap between the first illumination period and the second illumination period may be avoided by controlling the pulse width that defines the first illumination period or both of the pulse widths that define the first illumination period and the second illumination period, respectively.

Although in the second and third exemplary embodiments overlap between the first illumination period and the second illumination period is avoided, the invention is not limited to such a case. By decreasing the overlap between the first illumination period and the second illumination period instead of equalizing them, the period when the current consumption increases can be made shorter than in a case that the front surface lamp 34 and the back surface lamp 28B are turned on in a synchronized manner.

Exemplary Embodiment 4

Whereas in the second and third exemplary embodiments an image is read by receiving reflection light produced by illumination with white light, in a fourth exemplary embodiment an image is read by a line-sequential method. The line-sequential method is a method of reading one line by each reading operation by turning on one of red (R), green (G), and blue (B) light sources while switching between them. In the fourth exemplary embodiment, constituent elements having the corresponding ones in the second exemplary embodiment will be given the same reference symbols as the latter and will not be described redundantly.

Figure 24:
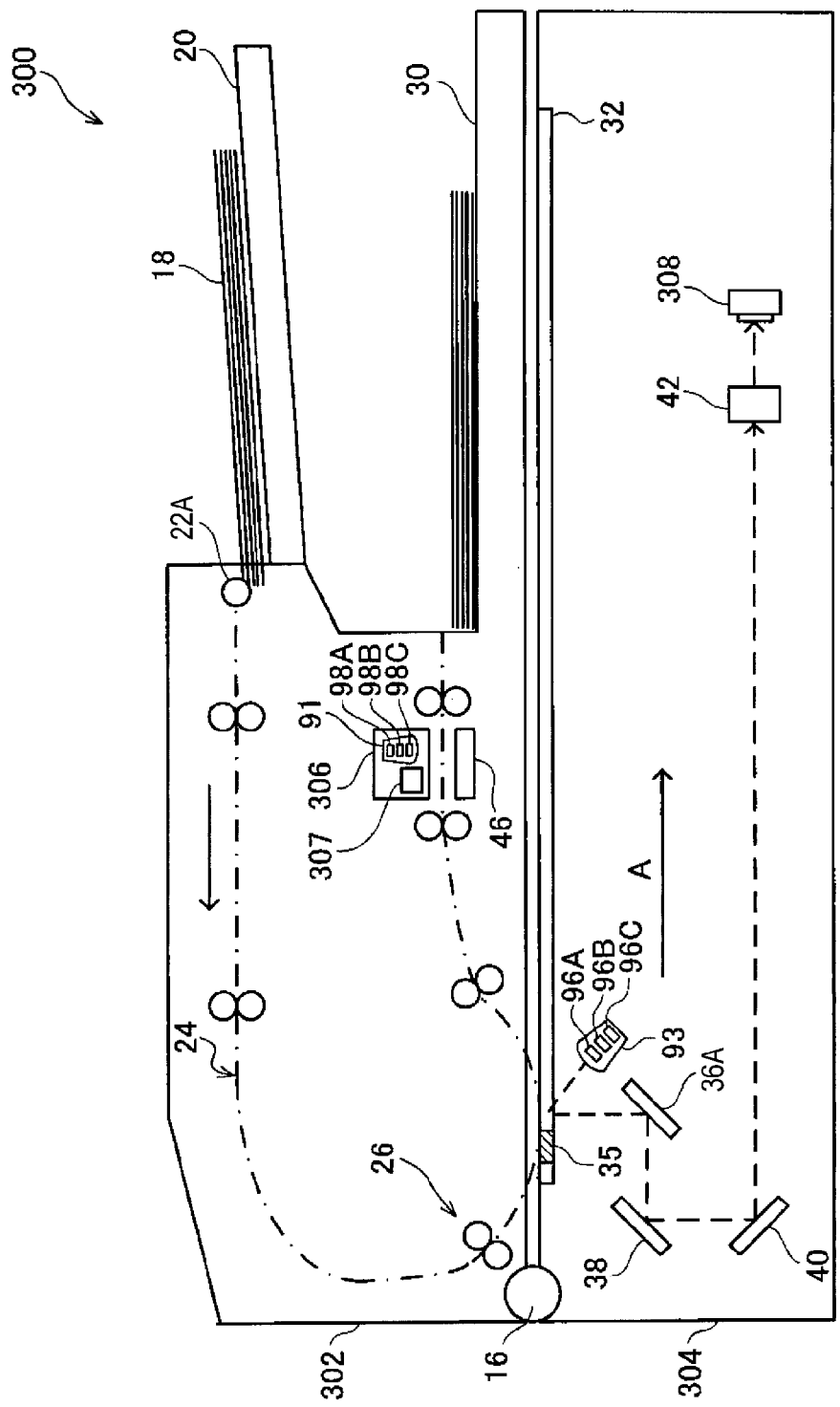
FIG. 24 is a schematic side view showing an example configuration of a structural aspect of an image reading apparatus according to a fourth exemplary embodiment.

For example, as shown in FIG. 24, an image reading apparatus 300 according to the fourth exemplary embodiment is different from the image reading apparatus 10A according to the second exemplary embodiment in that a document feeder 302 replaces the document feeder 12A and that a front surface image reading unit 304 replaces the front surface image reading unit 14A.

The document feeder 302 is different from the document feeder 12A in that a back surface image reading unit 306 replaces the back surface image reading unit 28. The back surface image reading unit 306 is different from the back surface image reading unit 28 in being equipped with a lightguide 91, a back surface first LED 98A, a back surface second LED 98B, and a back surface third LED 98C in place of the back surface lamp 28B and in being equipped with a back surface line sensor 307 in place of the back surface line sensor 28A. In the following, for the convenience of description, the back surface first LED 98A, the back surface second LED 98B, and the back surface third LED 98C will be referred to as a "back surface LED(s) 98" when it is not necessary to discriminate between them.

The back surface first LED 98A, the back surface second LED 98B, and the back surface third LED 98C are LEDs having an R emission wavelength range, a G emission wavelength range, and a blue B emission wavelength range, respectively. The back surface LEDs 98 are an example back surface illumination unit of the invention. A period when illumination with light emitted from the back surface first LED 98A is done, a period when illumination with light emitted from the back surface second LED 98B is done, and a period when illumination with light emitted from the back surface second LED 98C is done combined are an example second illumination period of the invention.

The back surface first LED 98A, the back surface second LED 98B, and the back surface third LED 98C are driven sequentially so as to emit R light, G light, and B light in predetermined circulation color order, that is, R→G→B→R→G→B . . . (one cycle: R→G→B). Although in the exemplary embodiment the first color and the last color of each cycle is R and B, respectively, the invention is not limited to such a case. The first color and the last color may be G and R or B and G, respectively.

The lightguide 91 extends long in the main scanning direction. The back surface LEDs 98 are attached to one end of the lightguide 91, which guides light that is emitted from a turned-on one of the back surface LEDs 98 to a document page 18 or the reference plate 46 in line form.

The back surface line sensor 307 is a monochrome image sensor in which plural photoelectric conversion elements (not shown) are arranged in line in the main scanning direction. The back surface line sensor 307 receives and performs photoelectric conversion on (a focused image of) reflection light produced by illuminating a document page 18 or the reference plate 46 with light emitted from a back surface LED 98 and thereby generates and outputs image information (i.e., an electrical signal corresponding to reception light quantities). The image information generated by the back surface line sensor 307 is image information representing an R image, image information representing a G image, or image information representing a B image.

The front surface image reading unit 304 is different from the front surface image reading unit 14A in being equipped with a lightguide 93, a front surface first LED 96A, a front surface second LED 96B, and a front surface third LED 96C in place of the front surface lamp 34 and in being equipped with a front surface line sensor 308 in place of the front surface line sensor 44. In the following, for convenience of description, the front surface first LED 96A, the front surface second LED 96B, and the front surface third LED 96C will be referred to as a "front surface LED(s) 96" when it is not necessary to discriminate between them. Furthermore, the front surface LEDs 96 and the back surface LEDs 98 will be referred to as LEDs with no reference symbols when it is not necessary to discriminate between them.

The front surface first LED 96A, the front surface second LED 96B, and the front surface third LED 96C are LEDs having an R emission wavelength range, a G emission wavelength range, and a blue B emission wavelength range, respectively. The front surface LEDs 96 are an example front surface illumination unit of the invention. A period when illumination with light emitted from the front surface first LED 96A is done, a period when illumination with light emitted from the front surface second LED 96B is done, and a period when illumination with light emitted from the front surface second LED 96C is done combined are an example first illumination period of the invention.

Like the back surface LEDs 98, the front surface first LED 96A, the front surface second LED 96B, and the front surface third LED 96C are driven sequentially so as to emit R light, G light, and B light in the predetermined circulation color order.

The lightguide 93 extends long in the main scanning direction. The front surface LEDs 96 are attached to one end of the lightguide 93, which guides light that is emitted from a turned-on one of the front surface LEDs 96 to a document page 18 or the reference plate 35 in line form.

The front surface line sensor 308 is a monochrome image sensor in which plural photoelectric conversion elements (not shown) are arranged in line in the main scanning direction. The front surface line sensor 308 receives and performs photoelectric conversion on (a focused image of) reflection light produced by illuminating a document page 18 or the reference plate 35 with light emitted from a front surface LED 96 and thereby generates and outputs image information (i.e., an electrical signal corresponding to reception light quantities). The image information generated by the front surface line sensor 308 is image information representing an R image, image information representing a G image, or image information representing a B image.

Figure 25:
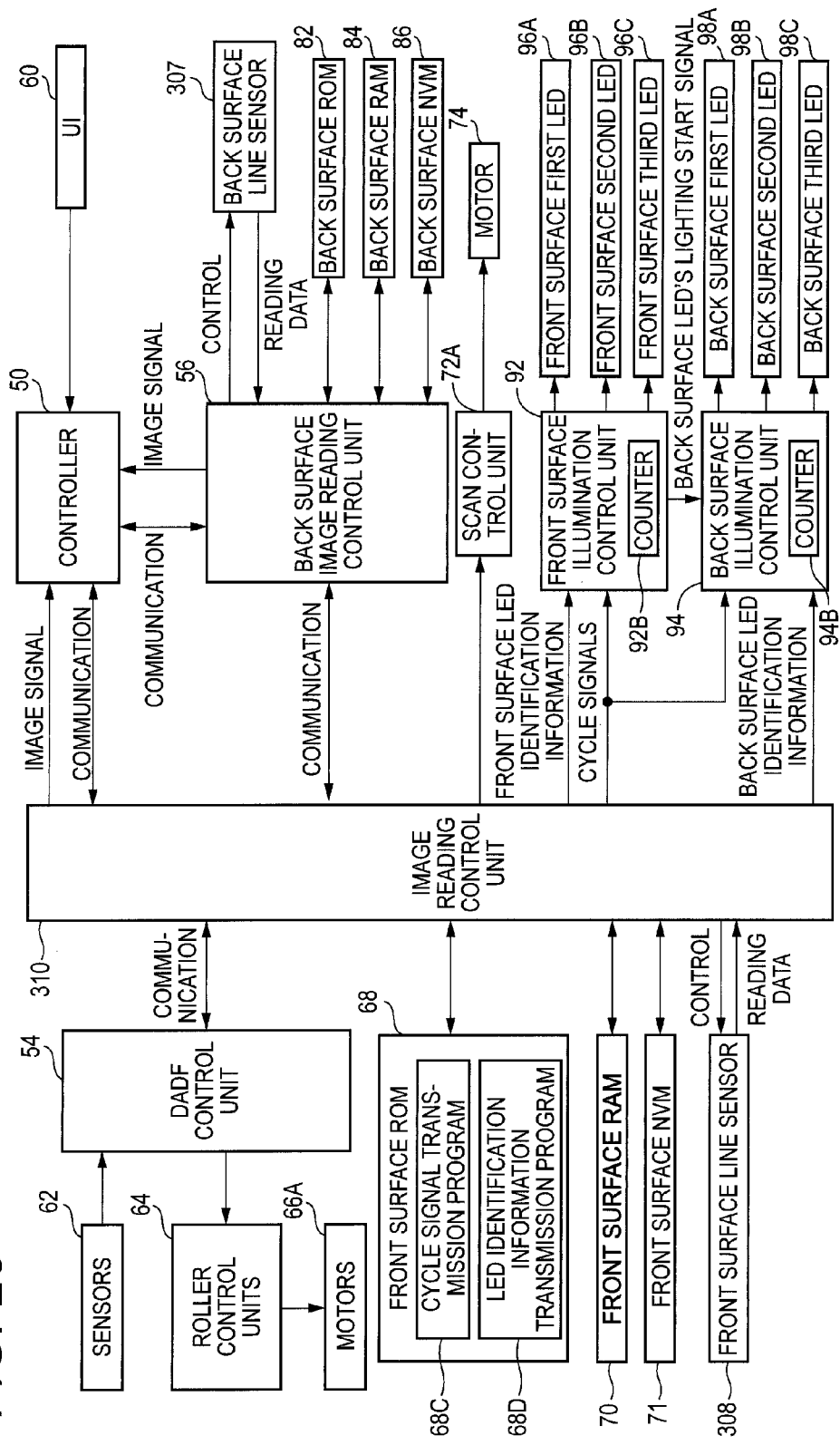
FIG. 25 is a block diagram showing an example configuration of an electric system of the image reading apparatus according to the fourth exemplary embodiment.

For example, as shown in FIG. 25, the image reading apparatus 300 is different from the image reading apparatus 10A in that a cycle signal transmission program 68C and an LED identification information transmission program 68D, instead of the cycle signal transmission program 68A, are stored in the front surface ROM 68, that an image reading control unit 310 replaces the image reading control unit 52, that a front surface illumination control unit 92 replaces the front surface illumination control unit 76, and that a back surface illumination control unit 94 replaces the back surface illumination control unit 77. In the following, for convenience of description, the front surface illumination control unit 92 and the back surface illumination control unit 94 will be referred to as illumination control units without reference numerals when it is not necessary to discriminate between them.

The image reading control unit 310 is different from the image reading control unit 52 in that the former sends cycle signals to the front surface illumination control unit 92 and the back surface illumination control unit 94 and that the former sends front surface LED identification information and back surface LED identification information (described later) to the front surface illumination control unit 92 and the back surface illumination control unit 94, respectively.

The front surface illumination control unit 92 is different from the front surface illumination control unit 76 in that the former is equipped with a counter 92B and that the former controls the front surface LEDs 96 instead of the front surface lamp 34.

The back surface illumination control unit 94 is different from the back surface illumination control unit 77 in that the former is equipped with a counter 94B and that the former controls the back surface LEDs 98 instead of the back surface lamp 28B.

Next, referring to FIG. 26, a description will be made of an LED identification information transmission process which is executed by the image reading control unit 310 when an image reading start instruction is received by the UI 60. The LED identification information transmission process is executed as the image reading control unit 310 runs the LED identification information transmission program 68D. The LED identification information transmission process is a process that is executed before a document page 18 is conveyed to the front surface reading position by the document feeder 302.

Figure 26:
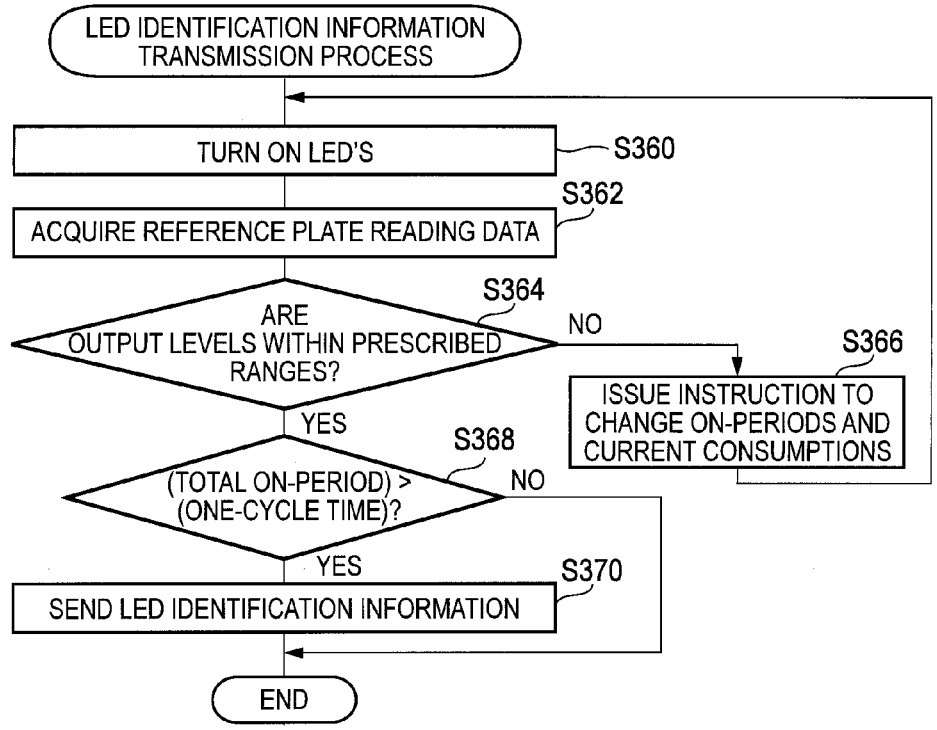
FIG. 26 is a flowchart of an example LED identification information transmission process according to the fourth exemplary embodiment.

In the LED identification information transmission process shown in FIG. 26, first, at step S360, the image reading control unit 310 controls the scan control unit 72A and the front surface illumination control unit 92 so that the reference plate 35 is illuminated with light that is emitted from the front surface LEDs 96 by turn them on only in one cycle, and controls the back surface illumination control unit 94 so that the reference plate 46 is illuminated with light that is emitted from the back surface LEDs 98 by turning them on only in one cycle. As a result, the front surface LEDs 96 and the back surface LEDs 98 are turned on in the circulation color order. On-periods and current consumptions of the respective LEDs are determined according to set values that are set by the illumination control units.

At step S362, the image reading control unit 310 acquires reference plate reading data which are generally classified as front surface data and back surface data. The front surface data are R, G, and B electrical signals obtained by receiving, by the front surface line sensor 308, reflection light beams produced by illuminating the reference plate 35 with the front surface LEDs 96. The back surface data are R, G, and B electrical signals obtained by receiving, by the back surface line sensor 307, reflection light beams produced by illuminating the reference plate 46 with the back surface LEDs 98.

At step S364, the image reading control unit 310 judges whether or not R, G, and B output levels of the front surface data and the back surface data that were acquired at step S362 are within prescribed ranges. If it is judged at step S364 that there are front surface data or back surface data acquired at step S362 some of whose R, G, and B output levels are out of the prescribed ranges (S354: no), the process moves to step S366. If it is judged at step S364 that the R, G, and B output levels of all of the front surface data and the back surface data acquired at step S362 are within prescribed ranges (S354: yes), the process moves to step S368.

At step S366, the image reading control unit 310 instructs the illumination control unit(s) to change the on-periods and the current consumptions of the LEDs corresponding to the reference plate reading data whose output levels were judged out of the prescribed ranges. Then the process returns to step S360. In response to the execution of step S366, the illumination control unit(s) changes those on-periods and current consumptions.

At step S368, the image reading control unit 310 judges whether or not the total on-period is longer than a one-cycle time that is defined by the cycle signals. The term "total on-period" is the sum of the on-periods of the respective LEDs that were turned on only in one cycle at step S360. However, the invention is not limited to such a case; the total on-period may be set shorter than the sum of the on-periods of the respective LEDs that were turned on only in one cycle at step S360.

If it is judged at step S368 that the total on-period is not longer than the one-cycle time that is defined by the cycle signals (S368: no), the LED identification information transmission process is finished. If it is judged at step S368 that the total on-period is longer than the one-cycle time that is defined by the cycle signals (S368: yes), the process moves to step S370.

Although at step S368 the total on-period is compared with the one-cycle time, the invention is not limited to such a case; the on-period of each LED may be compared with ⅓ of the one-cycle time. In the judgment that is made at step S368, the magnitude relationship between the on-period of each LED and ⅓ of the one-cycle time has the same meaning as that of the total on-period and the one-cycle time.

At step S370, the image reading control unit 310 sends, to the front surface illumination control unit 92, front surface LED identification information for identification of an LED to be turned on first among the front surface LEDs 96. And the image reading control unit 310 sends, to the back surface illumination control unit 94, back surface LED identification information for identification of an LED to be turned on first among the back surface LEDs 98. The LED identification information transmission process is finished upon execution of step S370.

At step S370, front surface LED identification information for identification of a front surface LED 96 having a highest current consumption among the front surface LEDs 96 that were turned on at step S360 is employed as example front surface LED identification information. And back surface LED identification information for identification of a back surface LED 98 having a lowest current consumption among the front surface LEDs 96 that were turned on at step S360 is employed as example front surface LED identification information.

Figure 27:
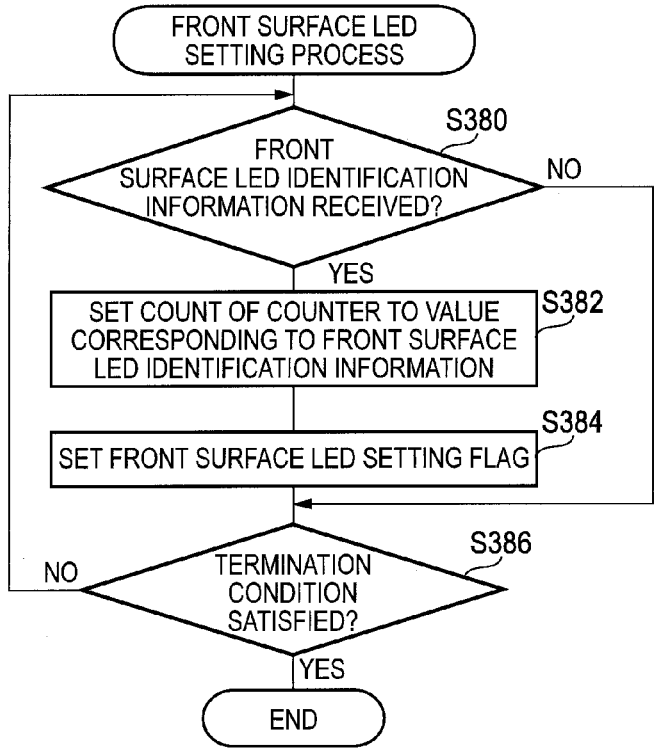
FIG. 27 is a flowchart of an example front surface LED setting process according to the fourth exemplary embodiment.

Next, referring to FIG. 27, a front surface LED setting process which is executed by the front surface illumination control unit 92 when an image reading start instruction is received by the UI 60.

In the front surface LED setting process shown in FIG. 27, first, at step S380, the front surface illumination control unit 92 judges whether or not it has received front surface LED identification information transmitted as a result of execution of step S370 of the LED identification information transmission process.

If it is judged at step S380 that no front surface LED identification information transmitted as a result of execution of step S370 of the LED identification information transmission process has been received (S380: no), the process moves to step S386. If it is judged at step S380 that front surface LED identification information transmitted as a result of execution of step S370 of the LED identification information transmission process has been received (S380: yes), the process moves to step S382.

At step S382, the front surface illumination control unit 92 sets the count of the counter 92B to a count corresponding to the received front surface LED identification information, that is, "0," "1," or "2." In the fourth exemplary embodiment, the front surface first LED 96A, the front surface second LED 96B, and the front surface third LED 96C are assigned "0," "1," or "2," respectively. In the fourth exemplary embodiment, to turn on the front surface LEDs 96A, 96B, and 96C in the circulation color order, the count returns to "0" when 1 is added to the count "2." Although in the fourth exemplary embodiment the initial setting count of the counter 92B is "0," it may be a value other than "0."

At step S384, the front surface illumination control unit 92 sets a front surface flag for indicating that the count of the counter 92B was set to the count corresponding to the received front surface LED identification information at step S382. Then the process moves to step S386.

At step S386, the front surface illumination control unit 92 judges whether a condition for termination of the front surface LED setting process is satisfied or not. An example of the condition for termination of the front surface LED setting process is that a predetermined time (e.g., 5 sec) should have elapsed from completion of the LED identification information transmission process. If it is judged at step S386 that the condition for termination of the front surface LED setting process is not satisfied (S386: no), the process returns to step S380. If it is judged at step S386 that the condition for termination of the front surface LED setting process is satisfied (S386: yes), the front surface LED setting process is finished.

Next, referring to FIG. 15, a description will be made of a cycle signal transmission process according to the fourth exemplary embodiment which is executed by the image reading control unit 310 when a cycle signal transmission process start condition which is a condition for a start of the cycle signal transmission process according to the fourth exemplary embodiment is satisfied. The cycle signal transmission process according to the fourth exemplary embodiment is executed as the image reading control unit 310 runs the cycle signal transmission program 68C.

For example, the cycle signal transmission process start condition is a condition that the front surface LED setting process should have completed, a condition that a back surface LED setting process should have completed, or a condition that the LED identification information transmission process should have completed with a negative judgment made at its step S368. In the following description of the cycle signal transmission process according to the fourth exemplary embodiment, steps having the same ones in the cycle signal transmission process according to the second exemplary embodiment will be given the same reference symbols as the latter and may not be described redundantly.

In the cycle signal transmission process according to the fourth exemplary embodiment shown in FIG. 15, at step S350, the image reading control unit 310 sends a cycle signal to the front surface illumination control unit 92 and the back surface illumination control unit 94.

Cycle signals used in the fourth exemplary embodiment are signals that define, as one cycle, a maximum allowable on-period of three lines and are determined according to an image reading resolution. The term "maximum allowable on-period of three lines" means a predetermined period that includes the sum of a maximum allowable on-period of an R line, a maximum allowable on-period of a G line, and a maximum allowable on-period of a B line. The maximum allowable on-period of an R line means a maximum allowable on-period when the front surface first LED 96A and the back surface first LED 98A are lit in synchronism with each other. The maximum allowable on-period of a G line means a maximum allowable on-period when the front surface second LED 96B and the back surface second LED 98B are lit in synchronism with each other. The maximum allowable on-period of a B line means a maximum allowable on-period when the front surface third LED 96C and the back surface third LED 98C are lit in synchronism with each other.

Next, referring to FIGS. 28 and 29, a description will be made of a first lighting control process which is executed when an image reading start instruction is received by the UI 60.

Figure 28:
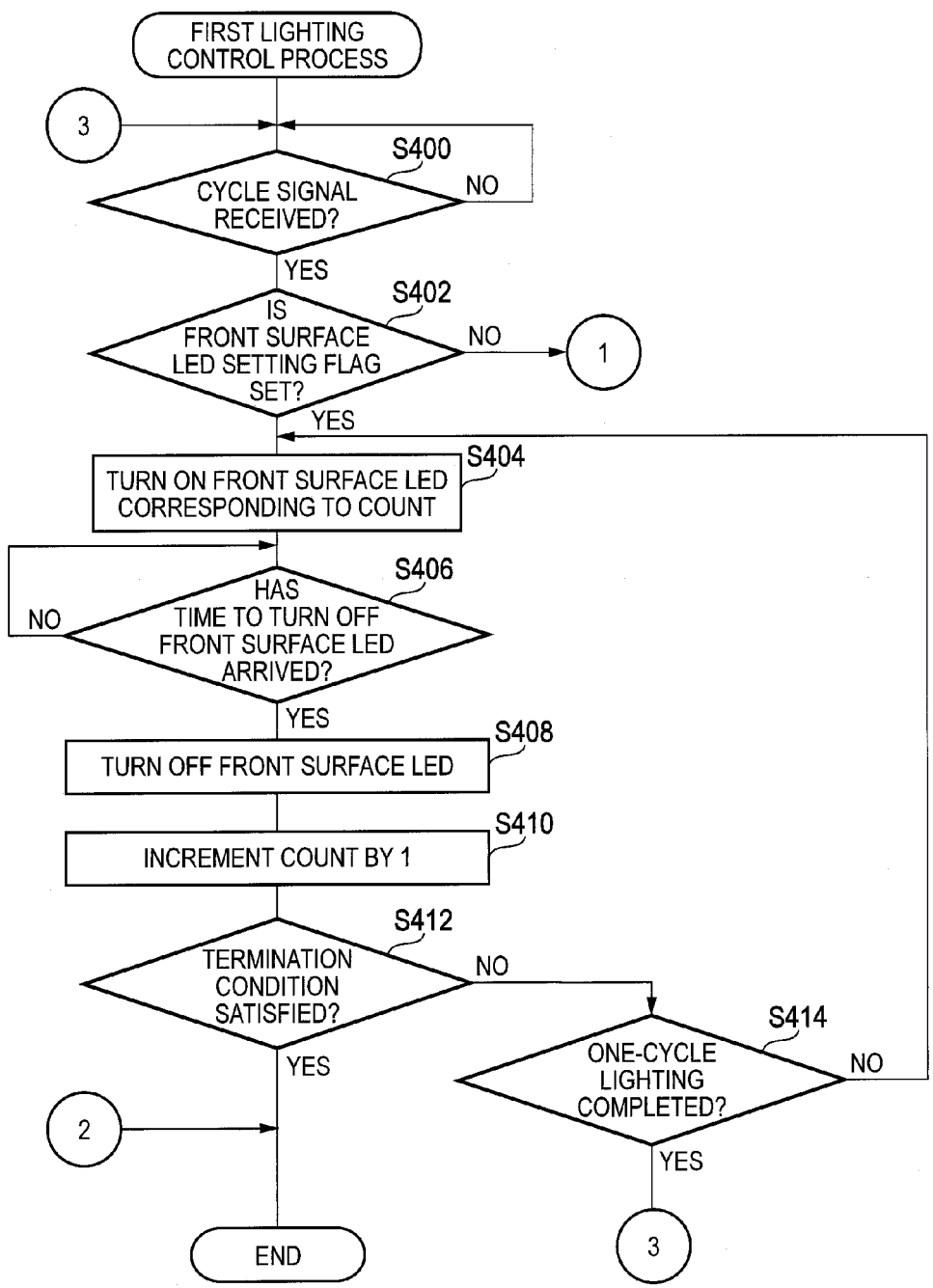
FIG. 28 is a flowchart of a main part of an example a first lighting control process according to the fourth exemplary embodiment.
Figure 29:
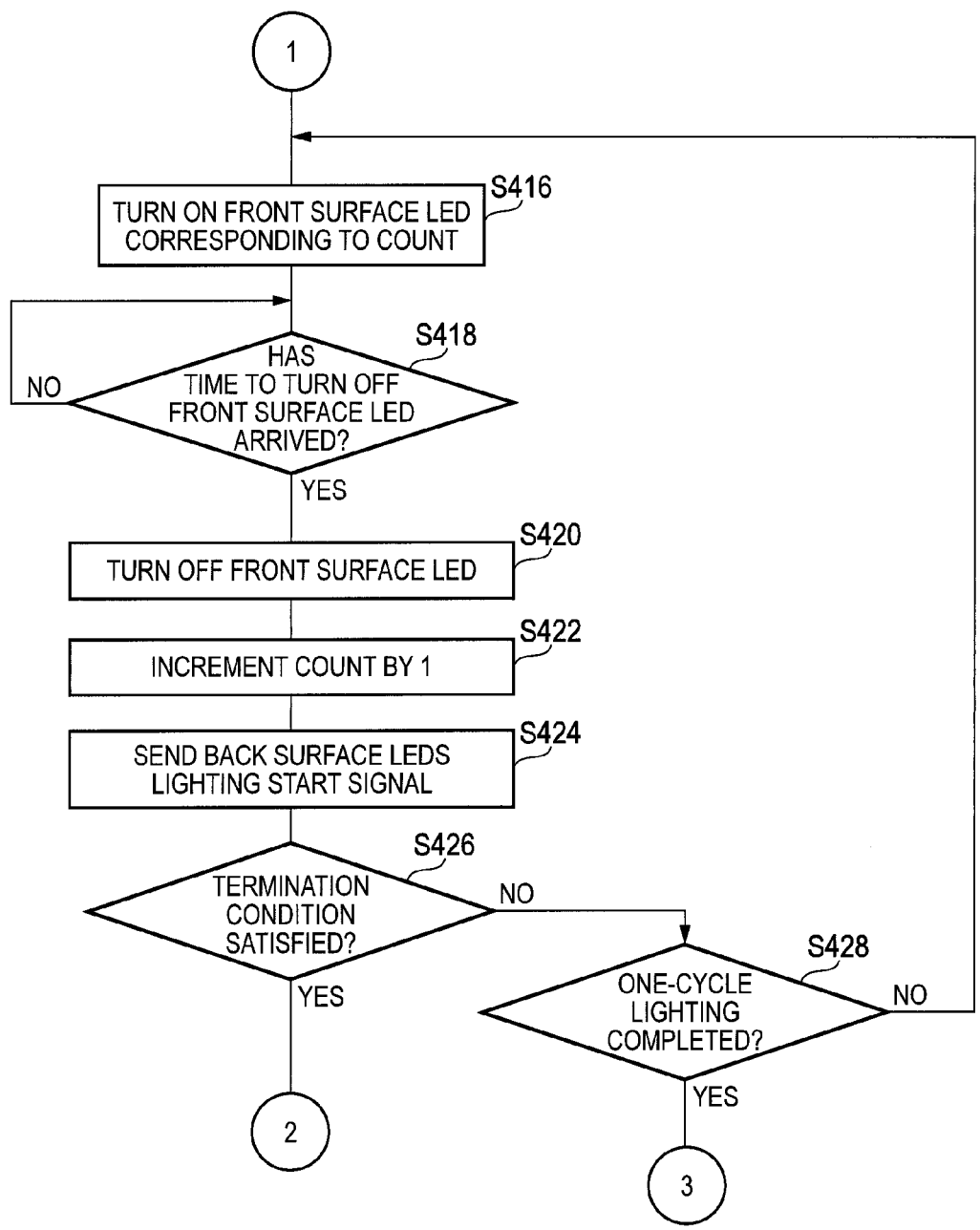
FIG. 29 is a flowchart of the other part of the example a first lighting control process according to the fourth exemplary embodiment.

In the first lighting control process shown in FIGS. 28 and 29, first, at step S400, the front surface illumination control unit 92 judges whether or not it has received a cycle signal transmitted as a result of execution of step S350 of the cycle signal transmission process according to the fourth exemplary embodiment. If it is judged at step S400 that no cycle signal transmitted as a result of execution of step S350 of the cycle signal transmission process according to the fourth exemplary embodiment has been received (S400: no), step S400 is executed again. If it is judged at step S400 that a cycle signal transmitted as a result of execution of step S350 of the cycle signal transmission process according to the fourth exemplary embodiment has been received (S400: yes), the process moves to step S402.

At step S402, the front surface illumination control unit 92 judges whether the front surface LED setting flag is set or not. If it is judged at step S402 that the front surface LED setting flag is set (S402: yes), the process moves to step S404. At step S404, the front surface illumination control unit 92 turns on the front surface LED 96 corresponding to the count of the counter 92B. Then the process moves to step S406.

At step S406, the front surface illumination control unit 92 judges whether a time to turn off the front surface LED 96 that was turned on at step S404 has arrived or not. An example of the time to turn off the front surface LED 96 that was turned on at step S404 is a time when a ⅓-cycle time has elapsed from the end of execution of step S404.

If it is judged at step S406 that the time to turn off the front surface LED 96 that was turned on at step S404 has not arrived yet (S406: no), step S406 is executed again. If it is judged at step S406 that the time to turn off the front surface LED 96 that was turned on at step S404 has arrived (S406: yes), the process moves to step S408. At step S408, the front surface illumination control unit 92 turns off the front surface LED 96. Then the process moves to step S410.

At step S410, the front surface illumination control unit 92 increments the count of the counter 92B by 1. Then the process moves to step S412.

At step S412, the front surface illumination control unit 92 judges whether a condition for termination of the first lighting control process is satisfied or not. An example of the condition for termination of the first lighting control process is the same condition as the condition for termination of the cycle signal transmission process. If it is judged at step S412 that the condition for termination of the first lighting control process is not satisfied (S412: no), the process moves to step S414. If it is judged at step S412 that the condition for termination of the first lighting control process is satisfied (S412: yes), the first lighting control process is finished. If an affirmative judgment is made at step S412, the count of the counter 92B is returned to the initial setting value and the front surface LED setting flag is cleared.

At step S414, the front surface illumination control unit 92 judges whether one-cycle lighting of the front surface LEDs 96 has completed or not. If it is judged at step S414 that one-cycle lighting of the front surface LEDs 96 has not completed yet (S414: no), the process returns to step S404. If it is judged at step S414 that one-cycle lighting of the front surface LEDs 96 has completed (S414: yes), the process returns to step S400.

On the other hand, if it is judged at step S402 that the front surface LED setting flag is not set (S402: no), the process moves to step S416 (see FIG. 29). At step S416, the front surface illumination control unit 92 turns on the front surface LED 96 corresponding to the count of the counter 92B. Then the process moves to step S418.

At step S418, the front surface illumination control unit 92 judges whether a time to turn off the front surface LED 96 that was turned on at step S416 has arrived or not. An example of the time to turn off the front surface LED 96 that was turned on at step S416 is the end of the on-period that is determined from the set value that was used when the front surface LED 96 was turned on at step S360 of the LED identification information transmission process.

If it is judged at step S418 that the time to turn off the front surface LED 96 that was turned on at step S416 has not arrived yet (S418: no), step S418 is executed again. If it is judged at step S418 that the time to turn off the front surface LED 96 that was turned on at step S416 has arrived (S418: yes), the process moves to step S420. At step S420, the front surface illumination control unit 92 turns off the front surface LED 96. Then the process moves to step S422.

At step S422, the front surface illumination control unit 92 increments the count of the counter 92B by 1. Then the process moves to step S424.

At step S424, as exemplified in FIG. 25, the front surface illumination control unit 92 sends, to the back surface illumination control unit 94, a back surface LEDs lighting start signal that commands a start of lighting of the back surface LEDs 98. Then the process moves to step S426.

At step S426, the front surface illumination control unit 92 judges whether the condition for termination of the first lighting control process is satisfied or not. If it is judged at step S426 that the condition for termination of the first lighting control process is not satisfied (S426: no), the process moves to step S428. If it is judged at step S426 that the condition for termination of the first lighting control process is satisfied (S426: yes), the first lighting control process is finished. If an affirmative judgment is made at step S426, the count of the counter 92B is returned to the initial setting value.

At step S428, the front surface illumination control unit 92 judges whether one-cycle lighting of the front surface LEDs 96 has completed or not. If it is judged at step S428 that one-cycle lighting of the front surface LEDs 96 has not completed yet (S428: no), the process returns to step S416. If it is judged at step S428 that one-cycle lighting of the front surface LEDs 96 has completed (S428: yes), the process returns to step S400.

Next, referring to FIG. 30, a description will be made of a back surface LED setting process which is executed when an image reading start instruction is received by the UI 160.

Figure 30:
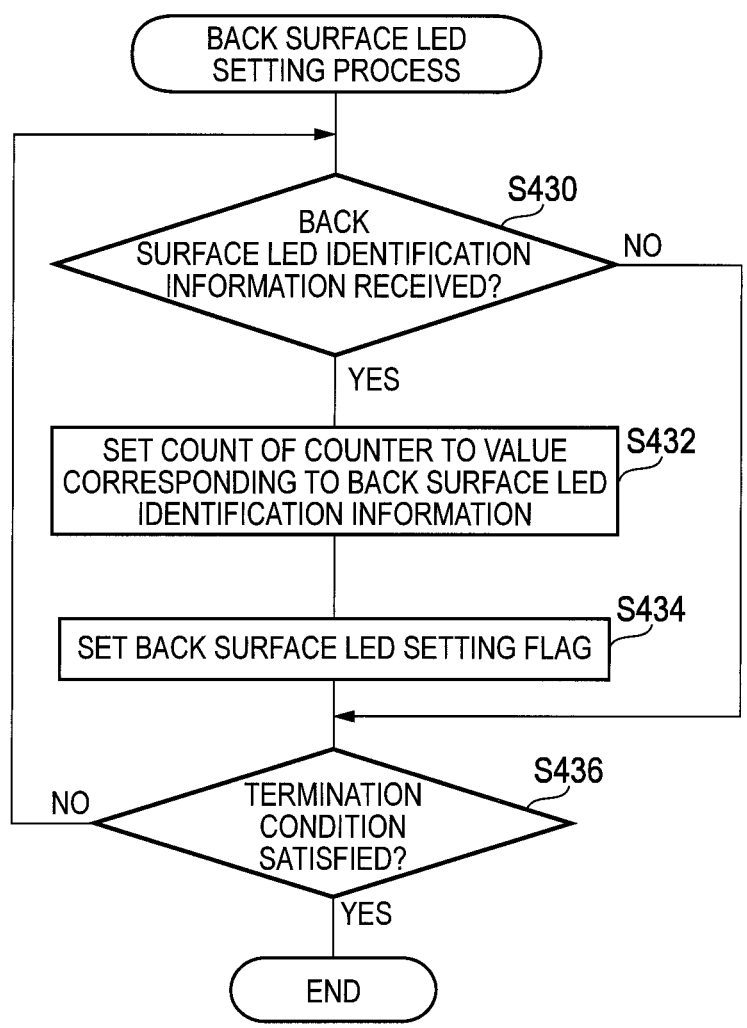
FIG. 30 is a flowchart of an example back surface LED setting process according to the fourth exemplary embodiment.

In the back surface LED setting process shown in FIG. 30, first, at step S430, the back surface illumination control unit 94 judges whether or not it has received back surface LED identification information transmitted as a result of execution of step S370 of the LED identification information transmission process.

If it is judged at step S430 that no back surface LED identification information transmitted as a result of execution of step S370 of the LED identification information transmission process has been received (S430: no), the process moves to step S436. If it is judged at step S430 that back surface LED identification information transmitted as a result of execution of step S370 of the LED identification information transmission process has been received (S430: yes), the process moves to step S432.

At step S432, the back surface illumination control unit 94 sets the count of the counter 94B to a count corresponding to the received back surface LED identification information, that is, "0," "1," or "2." In the fourth exemplary embodiment, the back surface first LED 98A, the back surface second LED 98B, and the back surface third LED 98C are assigned "0," "1," or "2," respectively. Although in the fourth exemplary embodiment the initial setting count of the counter 94B is "0," it may be a value other than "0."

At step S434, the back surface illumination control unit 94 sets a back surface flag for indicating that the count of the counter 94B was set to the count corresponding to the received back surface LED identification information at step S432. Then the process moves to step S436.

At step S436, the back surface illumination control unit 94 judges whether a condition for termination of the front surface LED setting process is satisfied or not. An example of the condition for termination of the back surface LED setting process is that a predetermined time should have elapsed from completion of the LED identification information transmission process. If it is judged at step S436 that the condition for termination of the back surface LED setting process is not satisfied (S436: no), the process returns to step S430. If it is judged at step S436 that the condition for termination of the back surface LED setting process is satisfied (S436: yes), the back surface LED setting process is finished.

Next, referring to FIGS. 31 and 32, a description will be made of a second lighting control process which is executed when an image reading start instruction is received by the UI 60.

Figure 31:
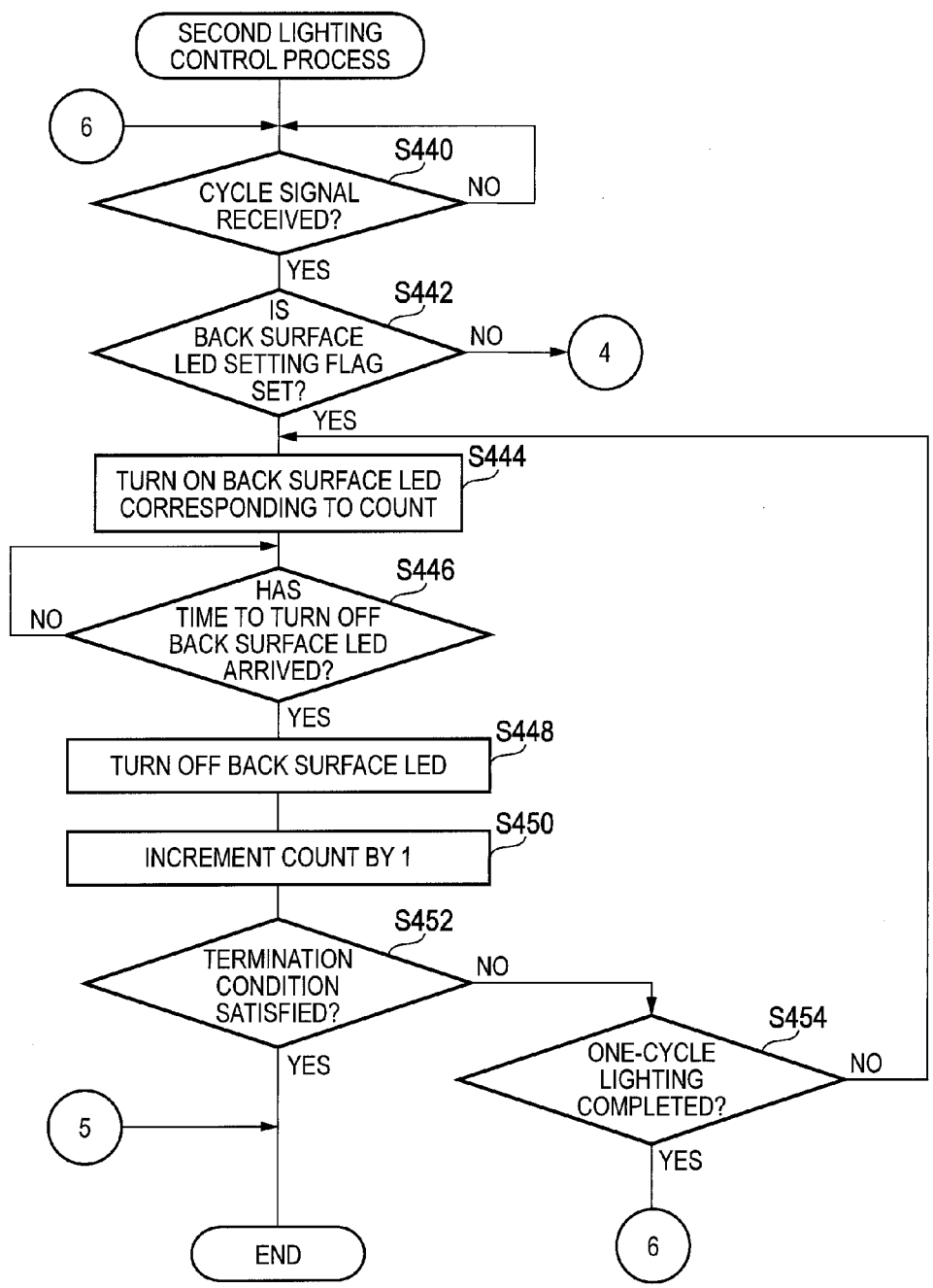
FIG. 31 is a flowchart of a main part of an example second lighting control process according to the fourth exemplary embodiment.
Figure 32:
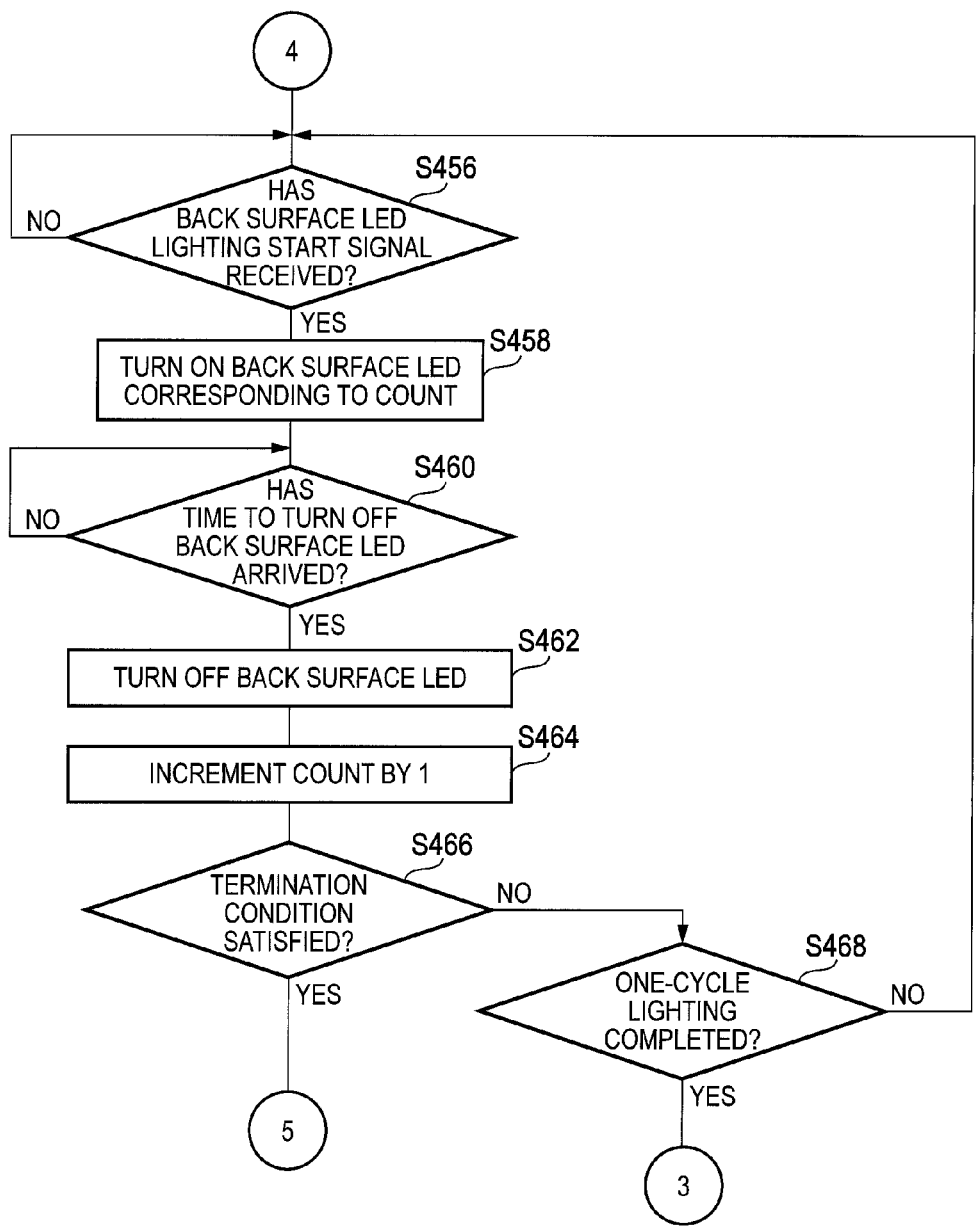
FIG. 32 is a flowchart of the other part of the example second lighting control process according to the fourth exemplary embodiment.

In the second lighting control process shown in FIGS. 31 and 32, first, at step S440, the back surface illumination control unit 94 judges whether or not it has received a cycle signal transmitted as a result of execution of step S350 of the cycle signal transmission process according to the fourth exemplary embodiment. If it is judged at step S440 that no cycle signal transmitted as a result of execution of step S350 of the cycle signal transmission process according to the fourth exemplary embodiment has been received (S440: no), step S440 is executed again. If it is judged at step S440 that a cycle signal transmitted as a result of execution of step S350 of the cycle signal transmission process according to the fourth exemplary embodiment has been received (S440: yes), the process moves to step S442.

At step S402, the back surface illumination control unit 94 judges whether the back surface LED setting flag is set or not. If it is judged at step S442 that the back surface LED setting flag is set (S402: yes), the process moves to step S444. At step S444, the back surface illumination control unit 94 turns on the back surface LED 98 corresponding to the count of the counter 94B. Then the process moves to step S446.

At step S446, the back surface illumination control unit 94 judges whether a time to turn off the back surface LED 98 that was turned on at step S444 has arrived or not. An example of the time to turn off the back surface LED 98 that was turned on at step S444 is a time when a ⅓-cycle time has elapsed from the end of execution of step S444.

If it is judged at step S446 that the time to turn off the back surface LED 98 that was turned on at step S444 has not arrived yet (S446: no), step S446 is executed again. If it is judged at step S446 that the time to turn off the back surface LED 98 that was turned on at step S444 has arrived (S446: yes), the process moves to step S448. At step S448, the back surface illumination control unit 94 turns off the back surface LED 98. Then the process moves to step S450.

At step S450, the back surface illumination control unit 94 increments the count of the counter 94B by 1. Then the process moves to step S452.

At step S452, the front surface illumination control unit 94 judges whether a condition for termination of the second lighting control process is satisfied or not. An example of the condition for termination of the second lighting control process is the same condition as the condition for termination of the cycle signal transmission process. If it is judged at step S452 that the condition for termination of the second lighting control process is not satisfied (S452: no), the process moves to step S454. If it is judged at step S452 that the condition for termination of the second lighting control process is satisfied (S452: yes), the second lighting control process is finished. If an affirmative judgment is made at step S452, the count of the counter 94B is returned to the initial setting value and the back surface LED setting flag is cleared.

At step S454, the back surface illumination control unit 94 judges whether one-cycle lighting of the back surface LEDs 98 has completed or not. If it is judged at step S454 that one-cycle lighting of the back surface LEDs 98 has not completed yet (S454: no), the process returns to step S454. If it is judged at step S454 that one-cycle lighting of the front surface LEDs 96 has completed (S454: yes), the process returns to step S440.

On the other hand, if it is judged at step S442 that the back surface LED setting flag is not set (S442: no), the process moves to step S456 (see FIG. 32). At step S456, the back surface illumination control unit 94 judges whether or not it has received a back surface LED lighting start signal transmitted as a result of execution of step S424 of the first lighting control process. If it is judged at step S456 that no back surface LED lighting start signal transmitted as a result of execution of step S424 of the first lighting control process has been received (S456: no), step S456 is executed again. If it is judged at step S456 that a back surface LED lighting start signal transmitted as a result of execution of step S424 of the first lighting control process has been received (S456: yes), the process moves to step S458.

At step S458, the back surface illumination control unit 94 turns on the back surface LED 98 corresponding to the count of the counter 94B. Then the process moves to step S460.

At step S460, the back surface illumination control unit 94 judges whether a time to turn off the back surface LED 98 that was turned on at step S458 has arrived or not. An example of the time to turn off the back surface LED 98 that was turned on at step S458 is the end of the on-period that is determined from the set value that was used when the back surface LED 98 was turned on at step S360 of the LED identification information transmission process.

If it is judged at step S460 that the time to turn off the back surface LED 98 that was turned on at step S458 has not arrived yet (S460: no), step S460 is executed again. If it is judged at step S460 that the time to turn off the back surface LED 98 that was turned on at step S458 has arrived (S460: yes), the process moves to step S462. At step S462, the back surface illumination control unit 94 turns off the back surface LED 98. Then the process moves to step S464.

At step S464, the back surface illumination control unit 94 increments the count of the counter 94B by 1. Then the process moves to step S466.

At step S466, the back surface illumination control unit 94 judges whether the condition for termination of the second lighting control process is satisfied or not. If it is judged at step S466 that the condition for termination of the second lighting control process is not satisfied (S466: no), the process moves to step S468. If it is judged at step S466 that the condition for termination of the second lighting control process is satisfied (S466: yes), the second lighting control process is finished. If an affirmative judgment is made at step S466, the count of the counter 94B is returned to the initial setting value.

At step S468, the back surface illumination control unit 94 judges whether one-cycle lighting of the back surface LEDs 98 has completed or not. If it is judged at step S468 that one-cycle lighting of the back surface LEDs 98 has not completed yet (S468: no), the process returns to step S456.

If it is judged at step S468 that one-cycle lighting of the back surface LEDs 98 has completed (S468: yes), the process returns to step S440.

Figure 33:
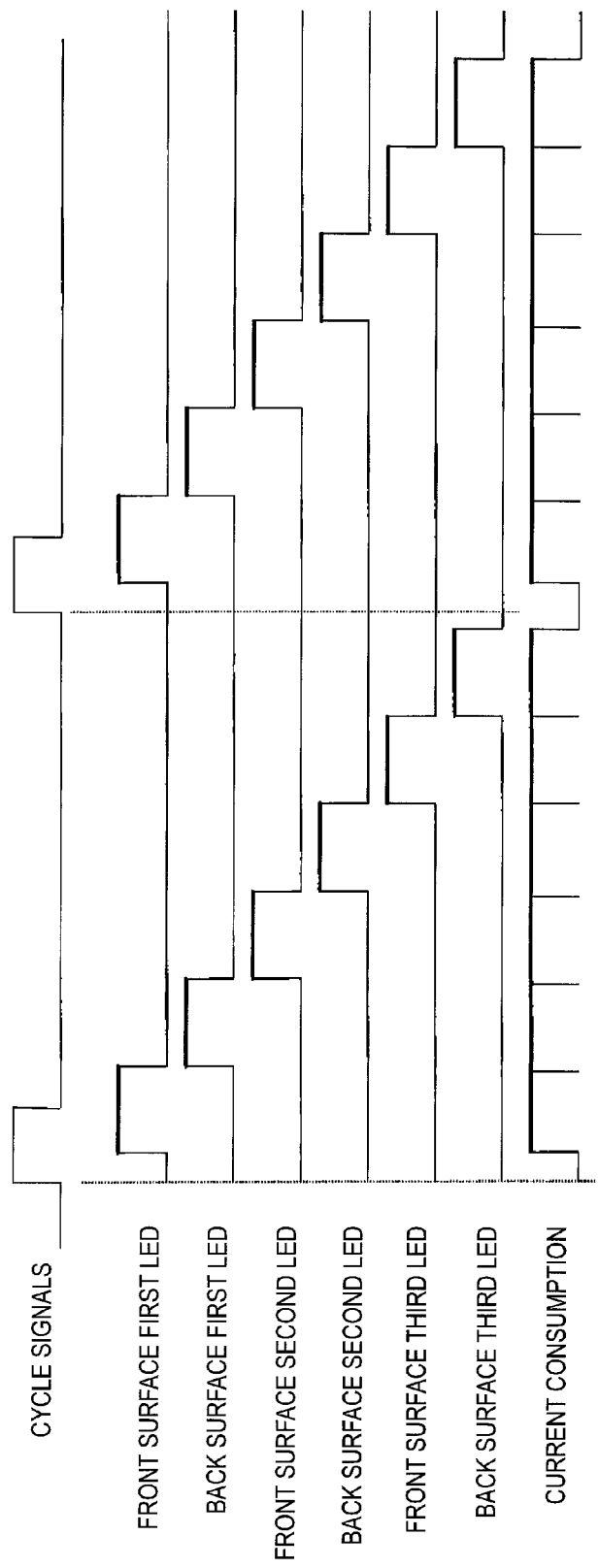
FIG. 33 is a time chart showing a first example set of state changes of cycle signals, on-periods of front surface LEDs, on-periods of back surface LEDs, and a current consumption in the fourth exemplary embodiment.

As described above, in the image reading apparatus 300, as exemplified in FIG. 33, overlap between the on-periods of the front surface LEDs 96 and the on-periods of the back surface LEDs 98 is avoided as a result of execution of steps S416-S428 of the first lighting control process and steps S456-S468 of the second lighting control process. Therefore, as exemplified in FIG. 33, overlap between periods when currents are consumed by the front surface LEDs 96 and periods when currents are consumed by the back surface LEDs 98 is also avoided. As a result, according to the image reading apparatus 300, increase of a current consumption in a period when illumination is made by light beams of the respective colors in the circulation color order is made smaller than in a case that overlap occurs between the on-periods of the front surface LEDs 96 and the on-periods of the back surface LEDs 98.

Figure 34:
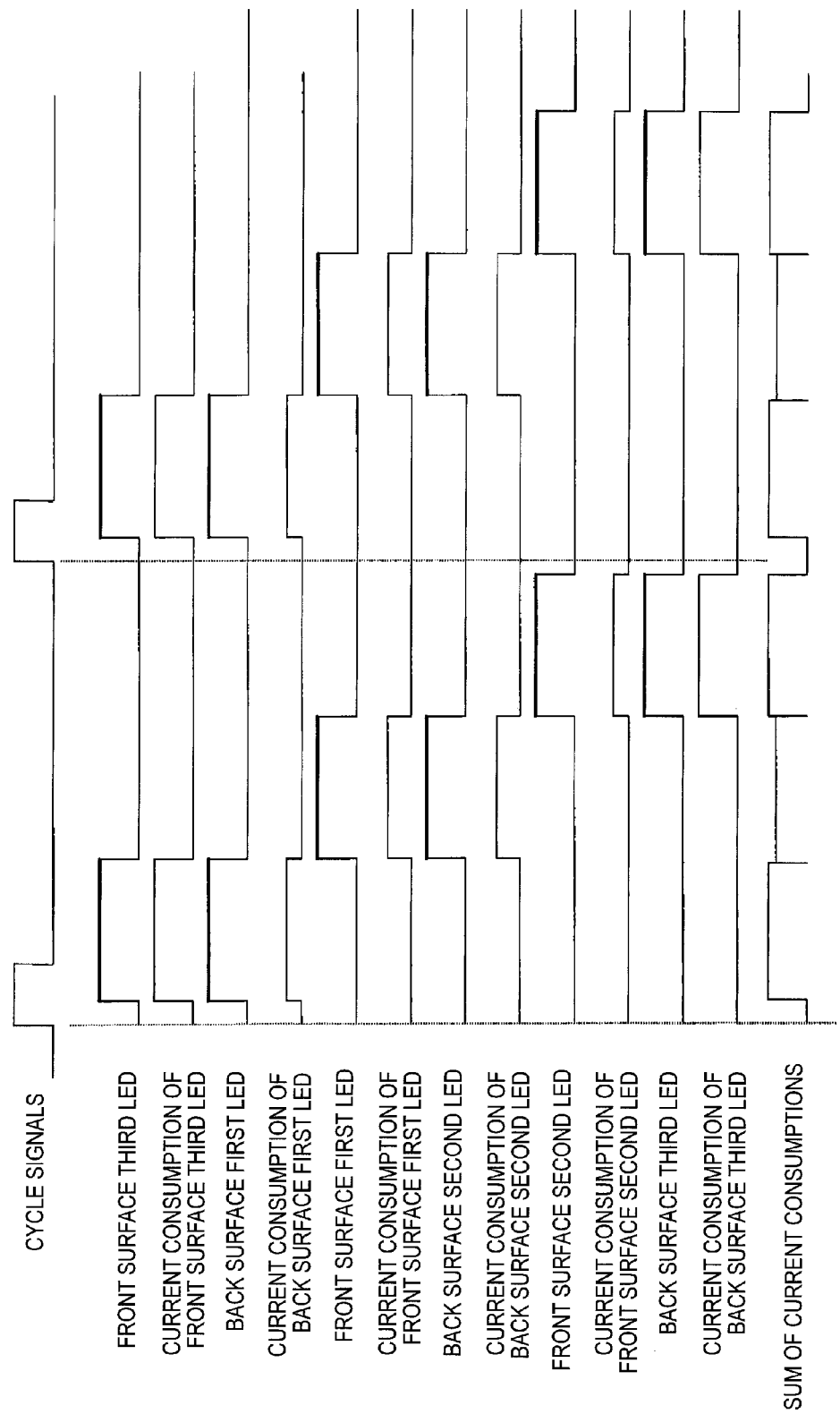
FIG. 34 is a time chart showing a second example set of state changes of cycle signals, on-periods of front surface LEDs, on-periods of back surface LEDs, and a current consumption in the fourth exemplary embodiment.

In the image reading apparatus 300, as exemplified in FIG. 34, the on-periods are controlled as a result of execution of steps S404-S414 of the first lighting control process and steps S444-S454 of the second lighting control process. In the example shown in FIG. 34, overlap occurs between a light emission period of a front surface LED 96 and a light emission period of a back surface LED 98. However, overlap occurs between the on-period of one, having a highest current consumption, of the front surface LEDs 96 and the on-period of one, having a lowest current consumption, of the back surface LEDs 98. As a result, increase of a current consumption in a period when illumination is made by light beams of the respective colors in the circulation color order is made smaller than in a case that overlap occurs between the on-period of one, having a highest current consumption, of the front surface LEDs 96 and the on-period of one, having a highest current consumption, of the back surface LEDs 98.

Although in the fourth exemplary embodiment overlap occurs between the on-period of one, having a highest current consumption, of the front surface LEDs 96 and the on-period of one, having a lowest current consumption, of the back surface LEDs 98, the invention is not limited to such a case. For example, overlap may be caused between the on-period of one, having a lowest current consumption, of the front surface LEDs 96 and the on-period of one, having a highest current consumption, of the back surface LEDs 98

Although in the fourth exemplary embodiment overlap between the light emission periods of the front surface LEDs 96 and the light emission periods of the back surface LEDs 98 is avoided by controlling the pulse width that defines the light emission period of the back surface LEDs 98, the invention is not limited to such a case. For example, overlap between the light emission periods of the front surface LEDs 96 and the light emission periods of the back surface LEDs 98 may be avoided by controlling the pulse width that defines the light emission period of the front surface LEDs 96 or both of the pulse width that defines the light emission period of the front surface LEDs 96 and the pulse width that defines the light emission period of the back surface LEDs 98.

Although in the fourth exemplary embodiment overlap between the light emission periods of the front surface LEDs 96 and the light emission periods of the back surface LEDs 98 is avoided, the invention is not limited to such a case. By decreasing the overlap between the light emission periods of the front surface LEDs 96 and the light emission periods of the back surface LEDs 98 instead of equalizing them, the periods when the current consumption increases can be made shorter than in a case that the front surface LEDs 96 and the back surface LEDs 98 are turned on in a synchronized manner.

The cycle signal transmission processes, the first lighting control processes, the second lighting control processes, the LED identification information transmission process, the front surface LED setting process, and the back surface LED setting process according to the second to fourth exemplary embodiments are just examples. It goes without saying that such modifications as deletion of unnecessary steps, addition of new steps, and change of execution order of steps are possible without departing from the spirit and scope of the invention.

Although in the second to fourth exemplary embodiments the cycle signal transmission processes and the LED identification information transmission process are implemented by a software configuration, the invention is not limited to such a case; they may be implemented by a hardware configuration such as an ASIC or an FPGA or a combination of a software configuration and a hardware configuration.

Although in the second to fourth exemplary embodiments the first lighting control processes, the second lighting control processes, the LED identification information transmission process, the front surface LED setting process, and the back surface LED setting process are executed by an ASIC, they may be implemented by a software configuration using a computer by running a program.

Figure 35:
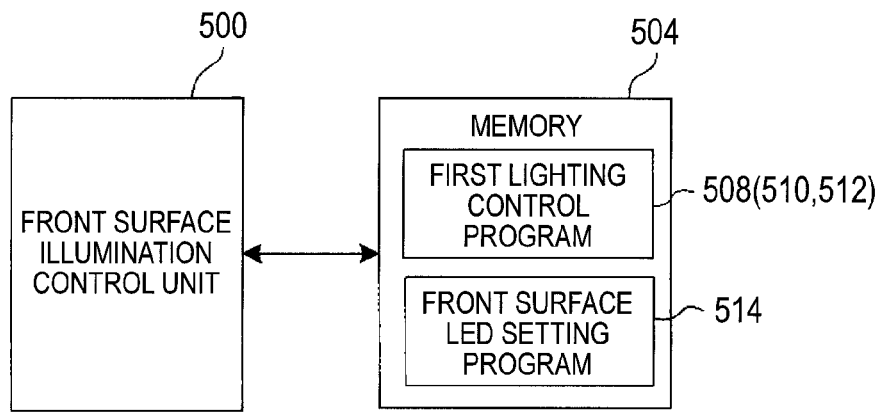
FIG. 35 is a block diagram showing an example configuration for realizing the individual steps of the first lighting control processes and the front surface LED setting process by a software configuration.

To implement the individual steps of each of the first lighting control processes and the front surface LED setting process by a software configuration, as exemplified in FIG. 35, a front surface illumination control unit 500 incorporating a CPU and a memory 504 may be used.

The memory 504, which is connected to the front surface illumination control unit 500, is stored with a first lighting control program 508, 510, or 512 and a front surface LED setting program 514. In this case, the first lighting control process according to the second exemplary embodiment is implemented in such a manner that the first lighting control program 508 is run by the front surface illumination control unit 500. The first lighting control process according to the third exemplary embodiment is implemented in such a manner that the first lighting control program 510 is run by the front surface illumination control unit 500. The first lighting control process according to the fourth exemplary embodiment is implemented in such a manner that the first lighting control program 512 is run by the front surface illumination control unit 500. Furthermore, the front surface LED setting process according to the fourth exemplary embodiment is implemented in such a manner that the front surface LED setting program 514 is run by the front surface illumination control unit 500.

Figure 36:
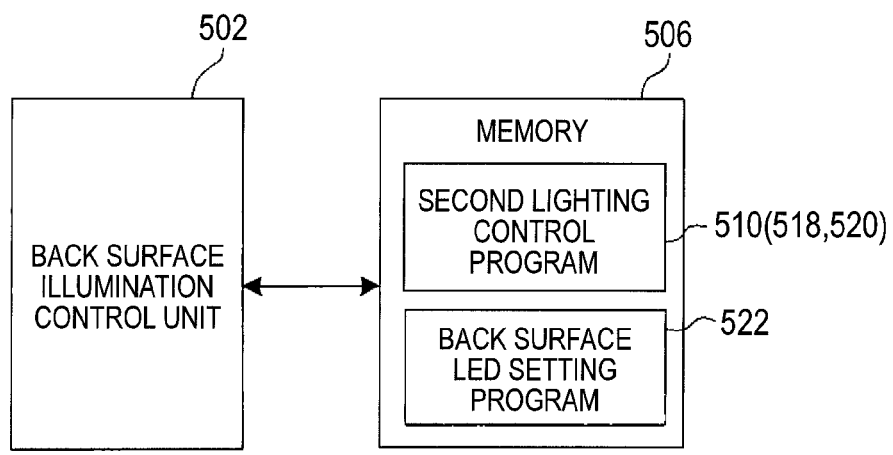
FIG. 36 is a block diagram showing an example configuration for realizing the individual steps of the second lighting control processes and the front surface LED setting process by a software configuration.

To implement the individual steps of each of the second lighting control processes and the back surface LED setting process, as exemplified in FIG. 36, a back surface illumination control unit 502 incorporating a CPU and a memory 506 may be used.

The memory 506, which is connected to the back surface illumination control unit 502, is stored with a second lighting control program 516, 518, or 520 and a back surface LED setting program 522. In this case, the second lighting control process according to the second exemplary embodiment is implemented in such a manner that the second lighting control program 516 is run by the back surface illumination control unit 502. The second lighting control process according to the third exemplary embodiment is implemented in such a manner that the second lighting control program 518 is run by the back surface illumination control unit 502. The second lighting control process according to the fourth exemplary embodiment is implemented in such a manner that the second lighting control program 520 is run by the back surface illumination control unit 502. Furthermore, the back surface LED setting process according to the fourth exemplary embodiment is implemented in such a manner that the back surface LED setting program 522 is run by the back surface illumination control unit 502.

Although in FIGS. 35 and 36 each program is stored in the memory 504 or 506, each program need not always be stored in the memory 504 or 506 from the beginning. For example, at first, each program may be stored in a portable storage medium to be used being connected to the image reading apparatus 10A, 200, or 300. The front surface illumination control unit 500 and the back surface illumination control unit 502 acquire programs from the portable storage medium and run them. Alternatively, each program may be stored in a storage unit of an external computer such as a server to be connected to the image reading apparatus 10A, 200, or 300 via a communication medium. In this case, the front surface illumination control unit 500 and the back surface illumination control unit 502 acquire programs from the external computer and run them.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:
1. An image reading apparatus comprising:
   an illumination unit that is disposed so as to be moved relative to a recording medium and illuminates the recording medium with light beams of plural colors that are circulated in predetermined order;
   a reading unit that reads an image recorded on the recording medium by receiving reflection light that is produced as a result of the illumination unit's illuminating the recording medium during the moving relative to the recording medium; and
   at least one central processing unit configured to function as a control unit that controls the illumination unit so that a difference between a first illumination interval between adjoining colors within each illumination cycle of light beams of the plural colors circulated in the predetermined order and a second illumination interval from illumination with light of a last color of the cycle to illumination with light of a first color of a next cycle is determined based on a reading resolution of the reading unit.

2. The image reading apparatus according to claim 1, wherein the at least one central processing unit configured to function as the control unit controls the illumination unit so that the first illumination interval is uniform and is shorter than the second illumination interval.

3. The image reading apparatus according to claim 1, wherein the at least one central processing unit configured to function as the control unit controls the illumination unit so that the second illumination interval becomes longer as the resolution becomes lower.

4. The image reading apparatus according to claim 1, wherein the at least one central processing unit configured to function as the control unit controls the illumination unit so that the first illumination interval becomes shorter than the second illumination interval if the resolution is lower than a threshold value, and that light beams of the plural colors are emitted at the same interval if the resolution is higher than or equal to the threshold value.

5. The image reading apparatus according to claim 1, wherein the second illumination interval varies with the resolution.

6. The image reading apparatus according to claim 1, wherein the second illumination interval is increased as the resolution becomes lower.

7. The image reading apparatus according to claim 1, wherein the first illumination interval is fixed irrespective of the resolution.

8. The image reading apparatus according to claim 1, wherein the at least one central processing unit is further configured to function as a relative speed changing unit that changes the speed of the relative movement to change the resolution.

9. An image forming apparatus comprising:
the image reading apparatus according to claim 1; and
an image forming unit that forms an image based on a reading result of the reading unit of the image reading apparatus.

10. A non-transitory computer readable medium storing a program causing a computer to function as the control unit of the image reading apparatus according to claim 1.

11. The image reading apparatus according to claim 1, wherein each of the cycles produces light beams of different colors in an identical color order defined by the predetermined order such that plural colors are circulated one after the next in each cycle to produce the light beams of different colors, the first illumination intervals being in a first color cycle and the second illumination being between the first color cycle and a second color cycle, and the reading intervals between a reading operation performed when receiving reflection light for each of the plural colors in the first color cycle is different than the reading interval between a last color in the first color cycle and a first color in the second color cycle.

12. An image reading apparatus comprising:
a front surface illumination unit that is moved relative to a front surface of a recording medium and illuminates the front surface with light;
a back surface illumination unit that is moved relative to a back surface of the recording medium and illuminates the back surface with light, and
at least one central processing unit configured to function as a control unit that controls the front surface illumination unit and the back surface illumination unit so as to decrease an overlap between a first illumination period when the front surface illumination unit illuminates the front surface and a second illumination period when the back surface illumination unit illuminates the back surface,
wherein each of the front surface illumination unit and the back surface illumination unit illuminates the recording medium with light beams of plural colors that are circulated in predetermined order while being moved relative to the recording medium,
wherein the first illumination period is a period when the front surface illumination unit illuminates the recording medium with light beams of the plural colors in the predetermined order once for each color,
wherein the second illumination period is a period when the back surface illumination unit illuminates the recording medium with light beams of the plural colors in the predetermined order once for each color,
wherein the at least one central processing unit configured to function as the control unit controls at least one of a pulse width that defines the first illumination period and a pulse width that defines the second illumination period so as to decrease an overlap between the first illumination period and the second illumination period within a cycle that is defined by the cycle signal received from the at least one central processing unit configured to function as an output unit only if the sum of the first illumination period and the second illumination period does not exceed a predetermined time that is shorter than or equal to the cycle, and
wherein if the sum exceeds the predetermined time, the at least one central processing unit configured to function as the control unit controls the front surface illumination unit and the back surface illumination unit so that the first illumination period and the second illumination period overlap with each other, and that an illumination period when the recording medium is illuminated with light of a color corresponding to a highest one of current consumptions required for illumination with light beams of the plural colors emitted from one of the front surface illumination unit and the back surface illumination unit and an illumination period when the recording medium is illuminated with light of a color corresponding to a lowest one of current consumptions required for illumination with light beams of the plural colors emitted from the other of the front surface illumination unit and the back surface illumination unit overlap with each other.

13. A non-transitory computer readable medium storing a program causing a computer to function as the control unit of the image reading apparatus according to claim 12.

14. The image reading apparatus according to claim 12, wherein the at least one central processing unit configured to function as the control unit controls an on-period of the front surface illumination unit and an on-period of the back surface illumination unit by controlling when the front surface illumination unit and the back surface illumination unit are activated.

* * * * *